United States Patent
Matsuo

(10) Patent No.: US 11,182,117 B2
(45) Date of Patent: Nov. 23, 2021

(54) INFORMATION PROCESSING APPARATUS, METHOD, AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventor: Taku Matsuo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 188 days.

(21) Appl. No.: 16/194,403

(22) Filed: Nov. 19, 2018

(65) Prior Publication Data
US 2019/0163422 A1 May 30, 2019

(30) Foreign Application Priority Data
Nov. 27, 2017 (JP) .............................. JP2017-226396

(51) Int. Cl.
*G06F 3/12* (2006.01)
(52) U.S. Cl.
CPC .......... *G06F 3/1262* (2013.01); *G06F 3/1204* (2013.01); *G06F 3/1285* (2013.01)
(58) Field of Classification Search
None
See application file for complete search history.

(56) References Cited

U.S. PATENT DOCUMENTS

| | | | |
|---|---|---|---|
| 2006/0139690 A1 | 6/2006 | Yagita | |
| 2011/0075198 A1 | 3/2011 | Agehama | |
| 2011/0317215 A1* | 12/2011 | Ida | H04N 1/00233 |
| | | | 358/1.15 |
| 2013/0129372 A1* | 5/2013 | Manabe | G03G 15/5083 |
| | | | 399/82 |
| 2017/0048416 A1* | 2/2017 | Cho | G06F 3/1288 |

FOREIGN PATENT DOCUMENTS

| | | |
|---|---|---|
| JP | 2005174122 | 6/2005 |
| JP | 2006004077 | 1/2006 |
| JP | 2006146716 | 6/2006 |
| JP | 2011070391 | 4/2011 |

OTHER PUBLICATIONS

"Office Action of Japan Counterpart Application", dated May 25, 2021, with English translation thereof, p. 1-p. 7.

* cited by examiner

*Primary Examiner* — Frantz Bataille
(74) *Attorney, Agent, or Firm* — JCIPRNET

(57) ABSTRACT

An information processing apparatus includes a reception unit that receives a group printing job constituted by plural printing jobs, and a transmission unit that transmits the group printing job received by the reception unit to the image forming apparatus, in accordance with performance related to the group printing job of the image forming apparatus.

11 Claims, 21 Drawing Sheets

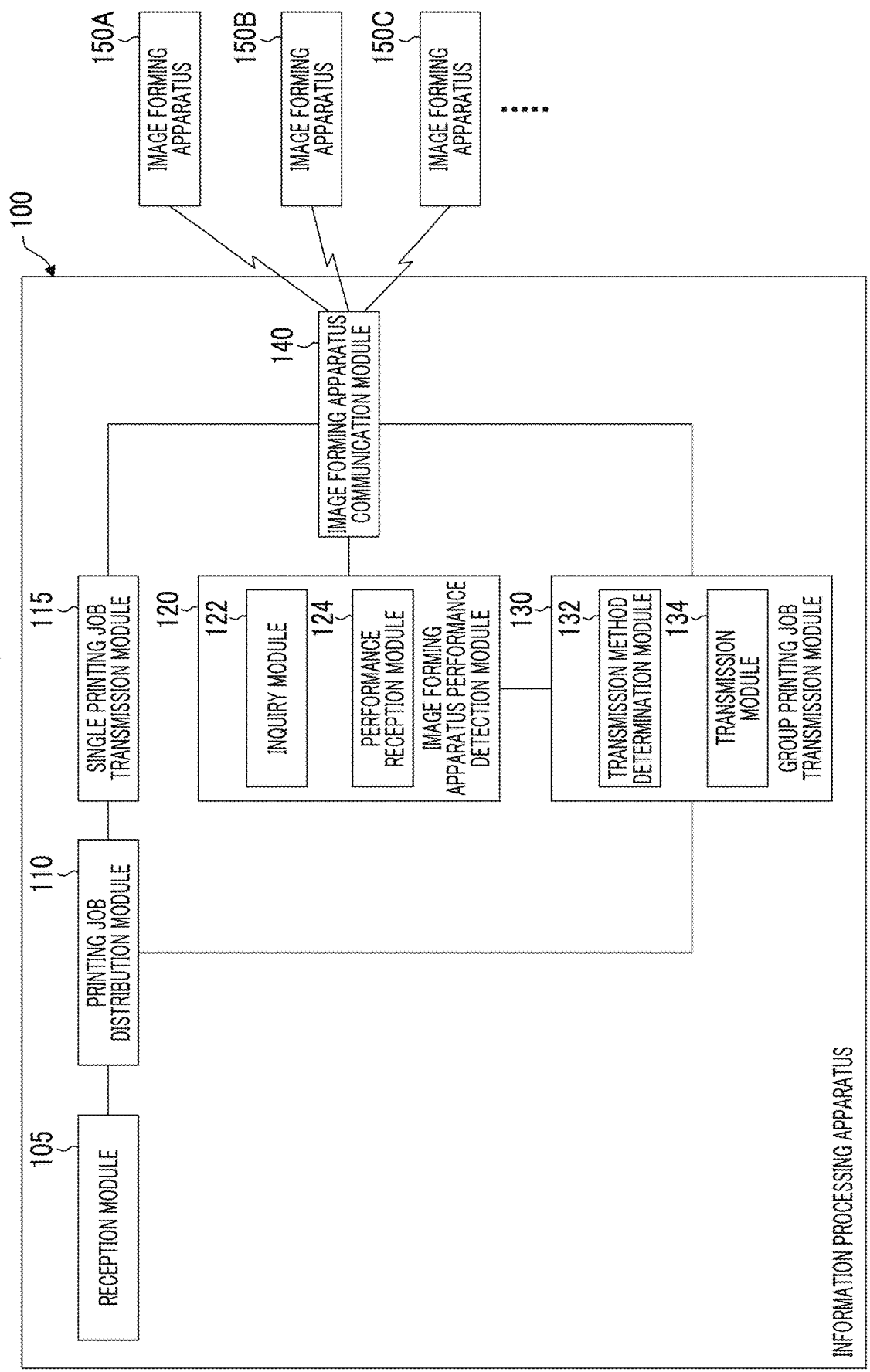

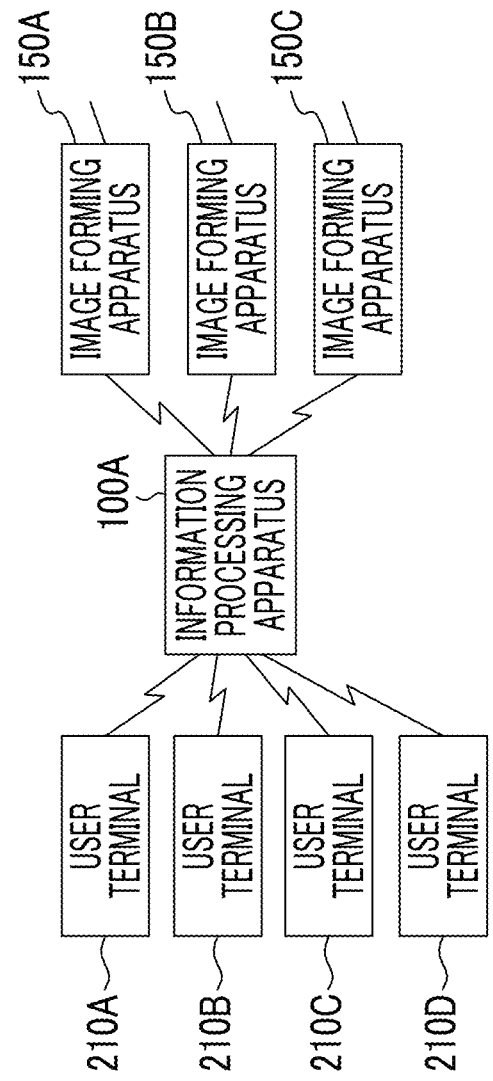

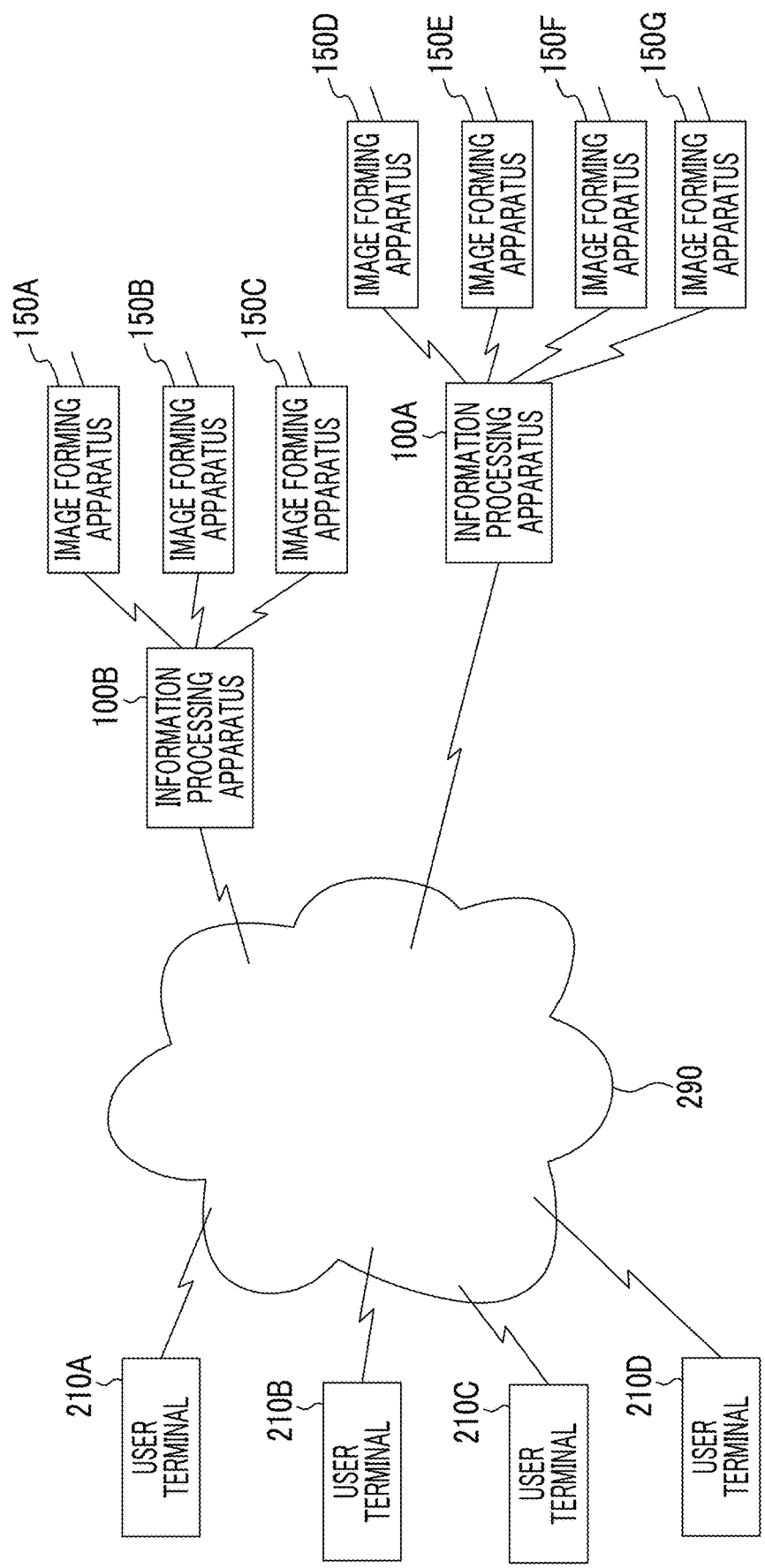

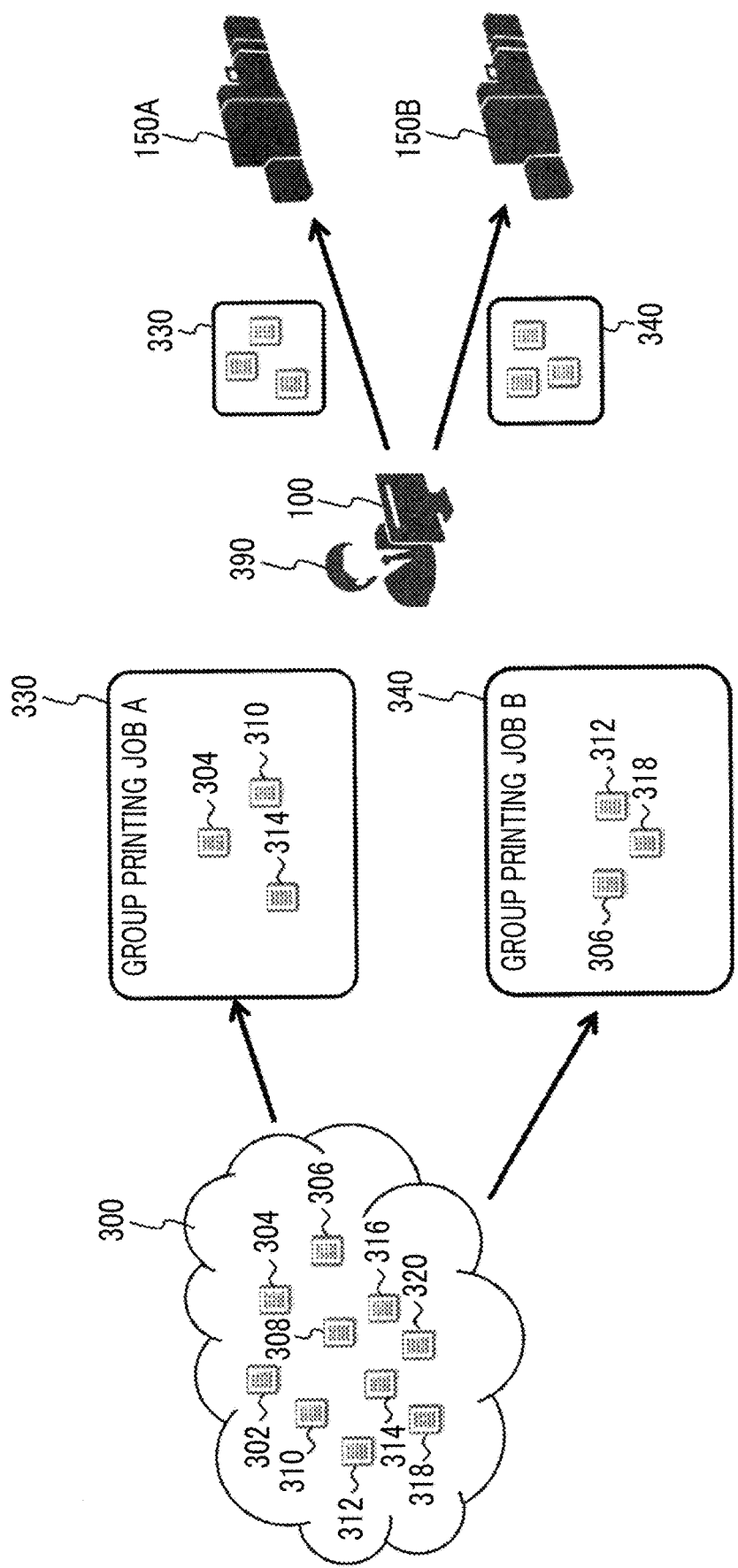

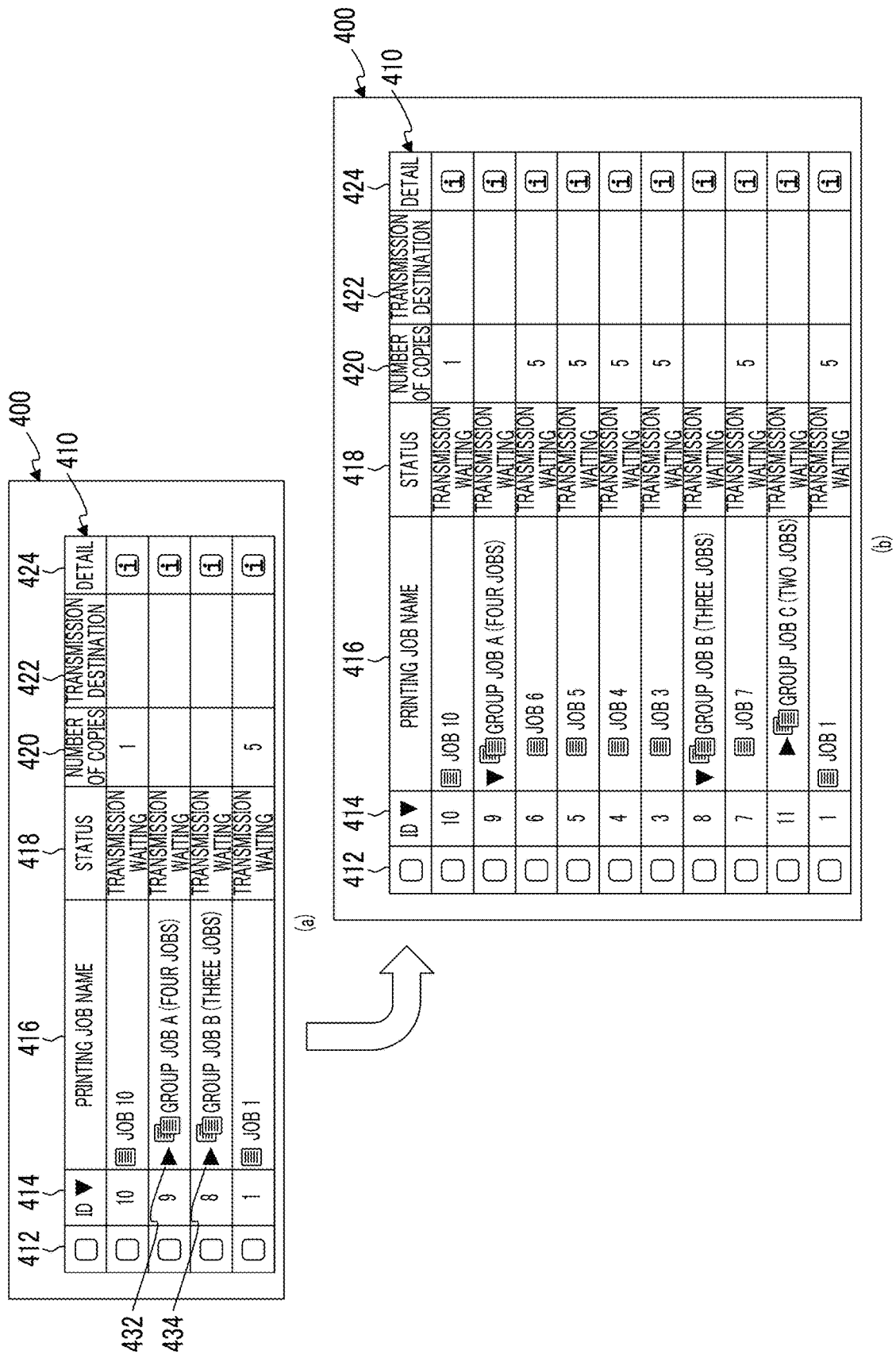

FIG. 6

| 605 | 610 | 615 | 620 | 625 | 630 |
|---|---|---|---|---|---|
| PRINTING JOB ID | GROUP FLAG | GROUP PRINTING JOB NAME | NUMBER OF PRINTING JOBS | PRINTING JOB ID | HIGHEST PRIORITY PRINTING JOB ID |
| 9 | 1 | GROUP JOB A | 5 | 1, 10, 15, 16, 20 | 15 |

| PRINTING JOB ID | GROUP FLAG | PRINTING JOB NAME | OWNER | NUMBER OF PAGES | NUMBER OF COPIES |
|---|---|---|---|---|---|
| 1 | 0 | PAMPHLET 00-1 | USER A | 16 | 50 |

| SHEET SIZE | SHEET TYPE | PRINTING DOCUMENT | COLOR/BLACK AND WHITE | DESIGNATED DATE AND TIME | POST-PROCESSING |
|---|---|---|---|---|---|
| A4 | | DOCUMENT ID | COLOR | | |

FIG. 10

| 1005 | 1010 | 1015 | 1020 | 1025 | 1030 |
|---|---|---|---|---|---|
| PRINTING APPARATUS ID | PRINTING APPARATUS NAME | PRINTING SPEED | GROUP PRINTING JOB PERFORMANCE | MOUNTABLE TONER TYPE | MOUNTABLE SHEET |
| | | | | | |

| 1035 | 1040 | 1045 | 1050 | 1055 |
|---|---|---|---|---|
| DOUBLE-SIDED PRINTING | MAXIMUM SHEET FEED CAPACITY | NUMBER OF DISCHARGING DESTINATIONS | POST-PROCESSING FUNCTION | PRINTING COST |
| | | | | |

1000

INFORMATION PROCESSING APPARATUS, METHOD, AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2017-226396 filed Nov. 27, 2017.

BACKGROUND

Technical Field

The present invention relates to an information processing apparatus and a non-transitory computer readable medium storing an information processing program.

SUMMARY

According to an aspect of the invention, there is provided an information processing apparatus including a reception unit that receives a group printing job constituted by plural printing jobs, and a transmission unit that transmits the group printing job received by the reception unit to an image forming apparatus, in accordance with performance related to the group printing job of the image forming apparatus.

BRIEF DESCRIPTION OF THE DRAWINGS

Exemplary embodiment(s) of the present invention will be described in detail based on the following figures, wherein:

FIG. 1 is a conceptual module configuration diagram illustrating a configuration example according to this exemplary embodiment;

FIGS. 2A and 2B are diagrams illustrating a system configuration example using this exemplary embodiment;

FIGS. 3A and 3B are diagrams illustrating a use example of this exemplary embodiment;

FIG. 4 is a diagram illustrating a display example of a screen according to this exemplary embodiment;

FIG. 6 is a diagram illustrating an example of a data structure of a group printing job table;

FIG. 8 is a diagram illustrating an example of a data structure of a printing job table;

FIG. 10 is a diagram illustrating an example of a data structure of a printing apparatus table;

DETAILED DESCRIPTION

Figure 5:
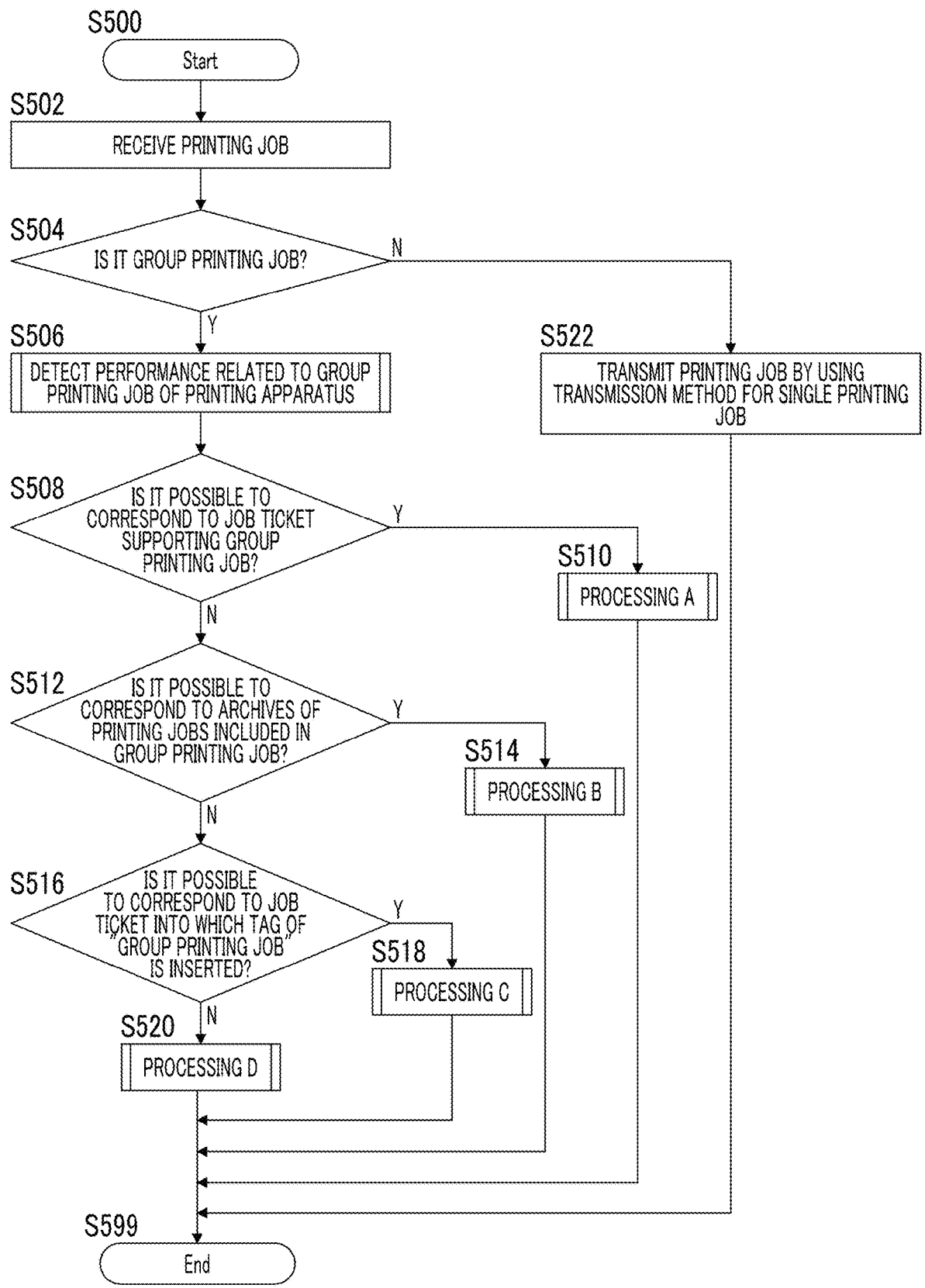
FIG. 5 is a flowchart illustrating a processing example according to this exemplary embodiment.

Hereinafter, an example of an exemplary embodiment in realizing the invention will be described with reference to the accompanying drawings.

FIG. 1 is a conceptual module configuration diagram illustrating a configuration example of this exemplary embodiment.

Meanwhile, the term "module" refers to components such as software (computer programs) and hardware which are typically capable of being logically separated. Consequently, the term "module" in this exemplary embodiment not only refers to modules in a computer program, but also to modules in a hardware configuration. Thus, this exemplary embodiment also serves as a description of a computer program (a program that causes a computer to execute respective operations, a program that causes a computer to function as respective units, or a program that causes a computer to realize respective functions), a system, and a method for inducing functionality as such modules. Meanwhile, although terms like "store" and "record" and their equivalents may be used in the description for the sake of convenience, these terms mean that a storage apparatus is made to store information or that control is applied to cause a storage apparatus to store information in the case where the exemplary embodiment is a computer program. In addition, while modules may be made to correspond with function on a one-to-one basis, some implementations may be configured such that one program constitutes one module, such that one program constitutes multiple modules, or conversely, such that multiple programs constitute one module. Moreover, plural modules may be executed by one computer, but one module may also be executed by plural computers in a distributed or parallel computing environment. Meanwhile, a single module may also contain other modules. In addition, the term "connection" may be used hereinafter to denote logical connections (such as the transmission and reception of data, instructions, a referential relationship between pieces of data, and log-in) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, according to conditions or states at that time, or according to conditions or states up to that time. In the case of plural "predetermined values", the predetermined values may be respectively different values, or two or more values (this obviously also includes the case of all values) which are the same. Additionally, statements to the effect of "B is conducted in the case of A" are used to denote that a determination is made regarding whether or not A holds true, and B is conducted in the case where it is determined that A holds true. However, this excludes cases where the determination of whether or not A holds true may be omitted. Additionally, the case of the listing of things such as "A, B, C" is illustrative listing unless otherwise indicated, and includes a case where only one of them is selected (for example, only A).

In addition, the terms "system" and "apparatus" not only encompass configurations in which plural computers, hardware, or apparatus are connected by a communication medium such as a network (including connections that support 1-to-1 communication), but also encompass configurations realized by a single computer, hardware, or apparatus. The terms "apparatus" and "system" are used interchangeably. Obviously, the term "system" does not include merely artificially arranged social constructs (social systems).

Also, every time a process is conducted by each module or every time plural processes are conducted within a module, information to be processed is retrieved from a storage apparatus, and the processing results are written back to the storage apparatus after the processing. Consequently, description of the retrieval from a storage apparatus before processing and the writing back to a storage apparatus after processing may be omitted in some cases. Meanwhile, the storage apparatus herein may include hard disks, random access memory (RAM), an external storage medium, storage apparatus accessed via a communication link, and registers, and the like inside a central processing unit (CPU).

An information processing apparatus 100 according to this exemplary embodiment receives a printing job and transmits the printing job to an image forming apparatus 150. As illustrated in the example of FIG. 1, the information processing apparatus includes a reception module 105, a printing job distribution module 110, a single printing job transmission module 115, an image forming apparatus performance detection module 120, a group printing job transmission module 130, and an image forming apparatus communication module 140.

In this exemplary embodiment, particularly, control of changing a transmission scheme for a group printing job is performed in accordance with a target image forming apparatus 150.

The group printing job is constituted by plural printing jobs. A group printing job which is a set of printing jobs is created in accordance with a management method for a user's printing job. For example, the following operation may be performed by the group printing job.

(1) Printing jobs related to a customer's order may be treated as a set.

(2) Printing jobs accumulated in the information processing apparatus 100 having a function as a spooler may be collectively treated in units in which operation may be effectively performed as follows according to a printing process operator's situation.

(a) Printing jobs are collected for each output sheet.
(b) Printing jobs having the same required post-processing are collected.
(c) Printing jobs are collected for each operator in charge.
(d) Printing jobs are collected in accordance with an operation date and an operation time.

An example of the image forming apparatus 150 is a production printer. The production printer performs light printing for an intra-office printing department of a company, and a print shop, and the like. In general, the image forming apparatus is in charge of a large quantity of printing. Meanwhile, the image forming apparatus is not limited to the production printer, and may be applied to general printers (printers for business, printers for home, and the like).

Particularly, in a case of the production printer, it is possible to reduce a loss time (a time for which printing processing may not be performed) of the production printer by corresponding to a group printing job.

The operation reception module 105 is connected to the printing job distribution module 110. The operation reception module 105 receives a printing job or a group printing job constituted by plural printing jobs.

The printing job distribution module 110 is connected to the reception module 105, the single printing job transmission module 115, and the group printing job transmission module 130. The printing job distribution module 110 determines whether the printing job received by the reception module 105 is a single printing job or a group printing job. The printing job distribution module transmits the printing job to the single printing job transmission module 115 in a case where the received printing job is a single printing job, and transmits the group printing job to the group printing job transmission module 130 in a case where the received printing job is a group printing job. For example, the printing job distribution module may perform the determination by using an indicator indicating whether being a group printing job included in the printing jobs received by the operation reception module 105, and may perform the determination in accordance with whether the printing jobs received by the reception module 105 include plural printing jobs.

The single printing job transmission module 115 is connected to the printing job distribution module 110 and the image forming apparatus communication module 140. The single printing job transmission module 115 selects the image forming apparatus 150 in accordance with properties (including printing setting) of the printing job transmitted from the printing job distribution module 110. For example, the image forming apparatus 150 including sheets designated in the printing job is selected. The printing job is transmitted to the selected image forming apparatus 150 through the image forming apparatus communication module 140.

The image forming apparatus performance detection module 120 includes an inquiry module 122 and a performance reception module 124, and is connected to the group printing job transmission module 130 and the image forming apparatus communication module 140.

The inquiry module 122 makes an inquiry about performance related to a group printing job of each image forming apparatus 150.

The performance reception module 124 receives the performance of the image forming apparatus 150 from the image forming apparatus 150 for which the inquiry is made. The received performance of the image forming apparatus 150 is transmitted to a transmission method determination module 132.

Meanwhile, the image forming apparatus performance detection module 120 may detect performance related to a group printing job of the image forming apparatus 150 without using the inquiry module 122 and the performance reception module 124. For example, a table storing performance related to group printing jobs of the image forming apparatuses 150 is prepared, and the image forming apparatus performance detection module 120 may extract performance related to a group printing job of a target image forming apparatus 150 from the table. For example, a printing apparatus table 1000 illustrated in the example of FIG. 10 to be described later is used as the table, and performance may be extracted from a group printing job performance column 1020 in the printing apparatus table 1000.

The group printing job transmission module 130 includes a transmission method determination module 132 and a transmission module 134, and is connected to the printing job distribution module 110, the image forming apparatus performance detection module 120, and the image forming apparatus communication module 140. The group printing job transmission module 130 transmits the group printing job received by the reception module 105 to the image forming apparatus 150 through the image forming apparatus communication module 140 in accordance with the performance related to the group printing job of the image forming apparatus 150.

Meanwhile, an example of the job ticket (also referred to as a printing job ticket) is a Job Definition Format (JDF). Here, the JDF refers to a data format for realizing CIP4 (The International Cooperation for the Integration of Processes in Prepress Press and Postpress), and is the industry standard designed to simplify the exchange of information between an application around the Graphic Arts industry and a system. Here, CIP4 achieves integration of all processes (for example, processes of prepress, press, and postpress) of printing from the previous process "process" of printing. It is possible to achieve the automation of a printing operation and quality stabilization. For this, the integration is performed by a common file format (JDF). The format of the JDF is based on eXtensible Markup Language (XML), and it is possible to give an instruction for any process related to the creation of printed matter and to perform unified management of work from design work to delivery. Meanwhile, the "prepress" refers to a process before printing, and specifically includes trial printing and the like. The "press" refers to a process of printing, and specifically includes printing processing itself. The "postpress" refers to a process after printing, and specifically includes cutting, folding processing, and the like.

That is, in the printing workflow using a JDF, an equipment reads out the JDF in each process, and advances processing in accordance with contents of the JDF. In the JDF, instructions for various processes are described. Meanwhile, the equipment refers to an equipment that performs processing of processes of the above-described process, prepress, press, and postpress, and includes, for example, includes a printing apparatus that performs trial printing (underprinting), a printing apparatus that performs main printing (printing of printed matter for delivery), a postprocess apparatus that performs postprocess such as binding and punching, and the like. This exemplary embodiment is used in a case where a group printing job is transmitted to the image forming apparatus 150 which is a printing apparatus.

The transmission method determination module 132 determines a transmission method in accordance with the performance received by the performance reception module 124.

The transmission module 134 transmits a target group printing job to the image forming apparatus 150 by using the transmission method determined by the transmission method determination module 132. In addition, the transmission module 134 may generate data of the group printing job received by the reception module 105, in accordance with the transmission method determined by the transmission method determination module 132, prior to the transmission to the image forming apparatus 150.

In a case where the image forming apparatus 150 may receive a job ticket in which a description related to the group printing job is made, the transmission module 134 transmits a printing job included in the group printing job received by the reception module 105 to the image forming apparatus 150 while attaching the job ticket. Further, the job ticket may be a job ticket in which at least information indicating the order of printing in the group printing job is described. Since "at least information indicating the order of printing in the group printing job is described in the job ticket", it is not required to follow the order of printing in a case where the printing job is transmitted to the image forming apparatus 150. The printing processing is performed on the image forming apparatus 150 side in accordance with the order.

Additionally, in a case where the image forming apparatus 150 may receive an archive of a printing job group constituting the group printing job, the transmission module 134 may transmit the archive of the printing job group constituting the group printing job received by the reception module 105 to the image forming apparatus 150.

Further, the transmission module 134 may add a file in which information on the group printing job is described, to the archive. In the file, for example, at least information on the order of printing in the group printing job is described as the information on the group printing job. The printing processing is performed on the image forming apparatus 150 side in accordance with the order.

Additionally, in a case where the image forming apparatus 150 may receive a job ticket in which information indicating being the group printing job may be described, the transmission module 134 may transmit a printing job included in the group printing job to the image forming apparatus 150 while attaching the job ticket. Here, the "job ticket in which information indicating being the group printing job may be described" specifically means that a tag indicating being the group printing job may be included in the job ticket. Since only the tag may be attached, other information, for example, information indicating the order of printing in the group printing job may not be described in the job ticket. Therefore, the printing job is transmitted to the image forming apparatus 150 in accordance with the order of printing in the group printing job. The printing processing is performed on the image forming apparatus 150 side in accordance with the received order.

Further, the transmission module 134 may transmit the printing job to the image forming apparatus 150 in accordance with the order of printing in the group printing job.

Additionally, in a case where the image forming apparatus 150 does not correspond to the group printing job, the transmission module 134 may transmit the printing job to the image forming apparatus 150 while including the information on the group printing job in the name of the printing job included in the group printing job received by the reception module 105. Here, the "including the information on the group printing job in the name of the printing job" specifically means that the name of the group printing job is inserted into the head of the name of the printing job. In a case where sorting is performed on the image forming apparatus 150 side in accordance with the name of the group printing job by inserting the name of the group printing job into the head, printing jobs belonging to the same group printing job may be arranged.

Further, the transmission module 134 may transmit the printing job to the image forming apparatus 150 in accordance with the order of printing in the group printing job. As described above, in a case where "the name of the group printing job is inserted into the head of the name of the printing job", information indicating the order of printing in the group printing job is not described. Therefore, the printing job is transmitted to the image forming apparatus 150 in accordance with the order of printing in the group printing job. The printing processing is performed on the image forming apparatus 150 side in accordance with the received order.

The image forming apparatus communication module 140 is connected to the single printing job transmission module 115, the image forming apparatus performance detection module 120, the group printing job transmission module 130, an image forming apparatus 150A, an image forming apparatus 150B, and an image forming apparatus 150C. The image forming apparatus communication module 140 transmits a printing job or a group printing job to the image forming apparatus 150. Each image forming apparatus 150 is inquired of performance related to the group printing job under the control of the image forming apparatus performance detection module 120, the performance of the image forming apparatus 150 is received as a reply, and the performance is transmitted to the image forming apparatus performance detection module 120.

In addition, the image forming apparatus communication module 140 performs First In, First Out (FIFO) transmission of printing jobs included in the group printing job to the image forming apparatus 150 in a designated order of arrangement, in accordance with a group printing job transmission method. The FIFO transmission is performed by performing control so that another printing job is not mixed during the transmission of the printing jobs included in the group printing job.

The image forming apparatus 150 (the image forming apparatus 150A, the image forming apparatus 150B, the image forming apparatus 150C, and the like) is connected to the image forming apparatus communication module 140 of the information processing apparatus 100. The image forming apparatus 150 receives a printing job or a group printing job transmitted from the information processing apparatus 100 to perform printing processing in accordance with the printing job. Meanwhile, the image forming apparatus 150 supports any one of the above-described four group printing job transmission methods.

Meanwhile, in the example of FIG. 1, three image forming apparatuses 150 are connected, but one or more image forming apparatuses 150 may be connected.

FIGS. 2A and 2B are diagrams illustrating a system configuration example using this exemplary embodiment.

Meanwhile, the information processing apparatus 100 may be included in an external controller of the image forming apparatus 150.

In the example illustrated in FIG. 2A, an information processing apparatus 100A is connected to user terminals 210 (a user terminal 210A, a user terminal 210B, a user terminal 210C, and a user terminal 210D), the image forming apparatuses 150 (the image forming apparatus 150A, the image forming apparatus 150B, and the image forming apparatus 150C).

The information processing apparatus 100A receives a printing job or a group printing job from the user terminal 210 and transmits the printing job or the group printing job to the image forming apparatus 150 suitable for the printing job or the group printing job. The image forming apparatus 150 performs printing processing in accordance with the received printing job or group printing job.

In the example illustrated in FIG. 2B, the information processing apparatus 100A, the information processing apparatus 100B, the user terminal 210A, the user terminal 210B, the user terminal 210C, and the user terminal 210D are connected to each other through a communication line 290. The communication line 290 may be a wireless line, a wired line, or a combination thereof, and may be, for example, the Internet, an intranet, or the like as communication infrastructure. In addition, the functions of the information processing apparatus 100 may be realized as cloud service.

The information processing apparatus 100A is connected to the image forming apparatus 150A, the image forming apparatus 150B, and the image forming apparatus 150C.

The information processing apparatus 100B is connected to an image forming apparatus 150D, an image forming apparatus 150E, an image forming apparatus 150F, and an image forming apparatus 150G.

The information processing apparatus 100 receives a printing job or a group printing job from the user terminal 210 through the communication line 290 and transmits the printing job or the group printing job to the image forming apparatus 150 suitable for the printing job or the group printing job. The image forming apparatus 150 performs printing processing in accordance with the received printing job or group printing job.

FIGS. 3A and 3B are diagrams illustrating a use example of this exemplary embodiment. A group printing job will be described in more detail.

The group printing job is constituted by plural printing jobs. That is, the group printing job is a unit of the collecting of some printing jobs, and is like a box including plural printing jobs. Therefore, the group printing job itself does not have printing data and printing setting, and the printing jobs as constituent elements individually have printing data and printing setting.

For example, some printing jobs are collected into any bundle advantageous to the user, such as the same sheet used in printing, and collective operations of the printing jobs are realized with respect to a group printing job which is a set of printing jobs. That is, the group printing job may be treated as just one printing job.

In addition, totalized information (for example, the number of printed sheets, and the like) of the printing jobs included in the group printing job is one of determination materials during the distribution of the printing jobs to the plural image forming apparatuses 150.

A printing job group 300 includes a printing job 302, a printing job 304, a printing job 306, a printing job 308, a printing job 310, a printing job 312, a printing job 314, a printing job 316, a printing job 318, a printing job 320, and the like. Among these, the printing jobs may be collected as described above. For example, it is possible to create a group printing job A 330 including the printing job 304, the printing job 310, and the printing job 314. In addition, it is possible to create a group printing job B 340 including the printing job 306, the printing job 312, and the printing job 318.

The information processing apparatus 100 may cause each of the image forming apparatuses 150 to perform processing such as the transmission of the printing job, pause, trial printing, restart of printing, and cancellation by an operation of a user 390.

In the group printing job A 330, in a case where any sheet A is set as a printing sheet, the image forming apparatus 150A having the sheet A set in advance (also referred to as "a stock X is set") is selected, and the group printing job A 330 is transmitted to the image forming apparatus 150A.

Additionally, in the group printing job B 340, in a case where a total number of printed sheets is 3000, the image forming apparatus 150B capable of performing printing without any work in the middle of the output of 3000 sheets (without removing the printed sheets from a discharged sheet reception unit in the middle of printing) is selected, and the group printing job B 340 is transmitted to the image forming apparatus 150B. In this case, the discharged sheet reception unit of the image forming apparatus 150B may receive 3000 sheets or more.

FIG. 4 is a diagram illustrating a display example of a screen 400 according to this exemplary embodiment, and illustrates displays examples of a group printing job and a printing job in the information processing apparatus 100.

In (a) of FIG. 4, a printing job display region 410 is displayed on the screen 400. The printing job display region 410 includes a check column 412, an ID column 414, a printing job name column 416, a status column 418, a number-of-copies column 420, a transmission destination column 422, and a detail column 424. The check column 412 includes a check column to be processed. The ID column 414 displays identification information (ID) of the printing job or the group printing job. The printing job name column 416 displays a printing job name of the printing job or the group printing job. The status column 418 displays the current conditions (status) of the printing job or the group printing job. The number-of-copies column 420 displays the number of copies in the printing job or the group printing job. The transmission destination column 422 displays a transmission destination (image forming apparatus 150) of the printing job or the group printing job. The detail column 424 has a button for displaying details of the printing job or the group printing job.

The following operation method for the group printing job is the same as that for the single printing job (printing job in the related art).

Printing job operations (transmission, copying, deletion, holding/cancellation, and the like) except for [editing]

Printing job operations (printing/restart, proof printing, pause, cancellation, and the like)

In addition, whether or not each operation is performed and action in the operation change depending on the status of printing jobs included in the group printing job.

In the printing job display region 410 illustrated in the example of (a) of FIG. 4, a first line shows ID: 10, printing job name: job 10, status: transmission waiting, the-number-of-copies: 1, and transmission destination: undecided, a second line shows ID: 9, printing job name: group job A (four jobs), status: transmission waiting, the-number-of-copies: undecided, and transmission destination: undecided, a third line shows ID: 8, printing job name: group job B (three jobs), status: transmission waiting, the-number-of-copies: undecided, and transmission destination: undecided, and a fourth line shows ID: 1, printing job name: job 1, status: transmission waiting, the-number-of-copies: 5, and transmission destination: undecided.

The printing job name columns 416 in the second and third lines are respectively given a group printing job mark 432 and a group printing job mark 434, which indicate group printing jobs. That is, an icon (a black triangular mark in (a) and (b) of FIG. 4) which indicates an opened/closed state of the group printing job is displayed at the head of the printing job name column 416. Switching between open display and close display of a target group printing job is performed by the user's selection operation (click operation) for the group printing job mark 432 and the group printing job mark 434. During initial display, the display is performed in a state where all group printing jobs are closed. Meanwhile, the "closed" refers to the display of printing jobs constituting the group printing job (see (b) of FIG. 4), and the "opened" refers to the display of only the group printing job (as if only one printing job is present).

A state where the group printing job is opened is illustrated in the example of (b) of FIG. 4.

In the printing job display region 410 illustrated in the example of (b) of FIG. 4, a first line shows ID: 10, printing job name: job 10, status: transmission waiting, the-number-of-copies: 1, and transmission destination: undecided, a second line shows ID: 9, printing job name: group job A (four jobs), status: transmission waiting, the-number-of-copies: undecided, and transmission destination: undecided, a third line shows ID: 6, printing job name: job 6, status: transmission waiting, the-number-of-copies: 5, and transmission destination: undecided, a fourth line shows ID: 5, printing job name: job 5, status: transmission waiting, the-number-of-copies: 5, and transmission destination: undecided, a fifth line shows ID: 4, printing job name: job 4, status: transmission waiting, the-number-of-copies: 5, and transmission destination: undecided, a sixth line shows ID: 3, printing job name: job 3, status: transmission waiting, the-number-of-copies: 5, and transmission destination: undecided, a seventh line shows ID: 8, printing job name: group job B (three jobs), status: transmission waiting, the-number-of-copies: undecided, and transmission destination: undecided, an eighth line shows ID: 7, printing job name: job 7, status: transmission waiting, the-number-of-copies: 5, and transmission destination: undecided, a ninth line shows ID: 11, printing job name: group job C (two jobs), status: transmission waiting, the-number-of-copies: undecided, and transmission destination: undecided, and a tenth line shows ID: 1, printing job name: job 1, status: transmission waiting, the-number-of-copies: 5, and transmission destination: undecided. The third line to the sixth line show a printing job group constituting a group printing job A, and the eighth line and the ninth line show a printing job group constituting a group printing job B. Meanwhile, the group printing job may further include a group printing job. The group printing job B includes a group printing job C. Meanwhile, it may be possible to form a group printing job up to a predetermined number of levels (for example, a maximum of three levels, and the like).

Meanwhile, in a case where the sorting of the ID column 414 is performed in the state of (b) of FIG. 4, a sorting target is a root printing job (a printing job which is not positioned under the group printing job, that is, a single printing job and a group printing job). This is because it is not suitable that printing jobs constituting the group printing job are separated from the group printing job and set to be sorting targets.

Additionally, in a case where the detail column 424 is selected by the user's selection operation, properties of printing jobs in the selected line are presented to a property screen (pop-up screen or the like). That is, general results of the properties of the printing jobs included in the group printing job are presented. For example, a logical OR, totalization, and the like of the properties are performed. Specifically, the extraction of properties of each printing job, the extraction of required post-processing functions (for example, stapler, binding, punching, and the like; also referred to as a finisher), the totalization of the number of sheets for each type of sheet, and the like are performed.

FIG. 5 is a flowchart illustrating a processing example according to this exemplary embodiment. The flowchart shows a processing example of the entire information processing apparatus 100, and mainly shows a processing example depending on case classification.

In step S502, the reception module 105 receives a printing job. For example, the reception module receives a group printing job table 600, a group printing job table 700, or a printing job table 800.

In step S504, the printing job distribution module 110 determines whether or not the received printing job is a group printing job. The processing proceeds to step S506 in a case where the received printing job is a group printing job, and proceeds to step S522 otherwise.

In step S506, the image forming apparatus performance detection module 120 detects performance related to the group printing job of the printing apparatus. A detailed process of step S506 will be described with reference to the flowchart illustrated in the example of FIG. 9.

In step S508, the transmission method determination module 132 determines whether or not it is possible to correspond to a job ticket supporting the group printing job. The processing proceeds to step S510 in a case where it is possible to correspond to the job ticket, and proceeds to step S512 otherwise.

In step S510, the transmission module 134 performs processing A. A detailed process of step S510 will be described later with reference to the flowchart illustrated in the example of FIG. 11.

In step S512, the transmission method determination module 132 determines whether or not it is possible to correspond to archives of printing jobs included in the group printing job. The processing proceeds to step S514 in a case where it is possible to correspond to the archives, and proceeds to step S516 otherwise.

In step S514, the transmission module 134 performs processing B. A detailed process of step S514 will be described later with reference to the flowchart illustrated in the example of FIG. 14.

In step S516, the transmission method determination module 132 determines whether or not it is possible to correspond to a job ticket into which a tag of "group printing job" is inserted. The processing proceeds to step S518 in a case where it is possible to correspond to the job ticket, and proceeds to step S520 otherwise.

In step S518, the transmission module 134 performs processing C. A detailed process of step S518 will be described later with reference to the flowchart illustrated in the example of FIG. 17.

In step S520, the transmission module 134 performs processing D. A detailed process of step S520 will be described later with reference to the flowchart illustrated in the example of FIG. 20.

In step S522, the single printing job transmission module 115 transmits the printing job by using a transmission method for a single printing job.

An example of a data structure of a group printing job is the group printing job table 600 or the group printing job table 700.

FIG. 6 is a diagram illustrating an example of a data structure of the group printing job table 600. The group printing job table 600 includes a printing job ID column 605, the group flag column 610, a group printing job name column 615, a number-of-printing jobs column 620, a printing job ID column 625, and a highest priority printing job ID column 630. The printing job ID column 605 stores information (printing job identification (ID)) for uniquely identifying a printing job or a group printing job in this exemplary embodiment. The group flag column 610 stores information (group flag) indicating whether being a group printing job. The group printing job name column 615 stores the name of the group printing job. The number-of-printing jobs column 620 stores the number of printing jobs included in the group printing job. The printing job ID column 625 stores a printing job ID included in the group printing job. Plural printing job IDs are stored in the printing job ID column 625. The highest priority printing job ID column 630 stores a printing job ID regarding printing with the highest priority in the group printing job.

The process of step S504 is performed by checking the group flag column 610.

For example, FIG. 6 shows group flag: 1 (a flag indicating being a group printing job), group printing job name: group job A, the number of printing jobs: 5, printing job ID: 1, 10, 15, 16, 20, and highest priority printing job ID: 15, regarding printing job ID: 9.

Figure 7:
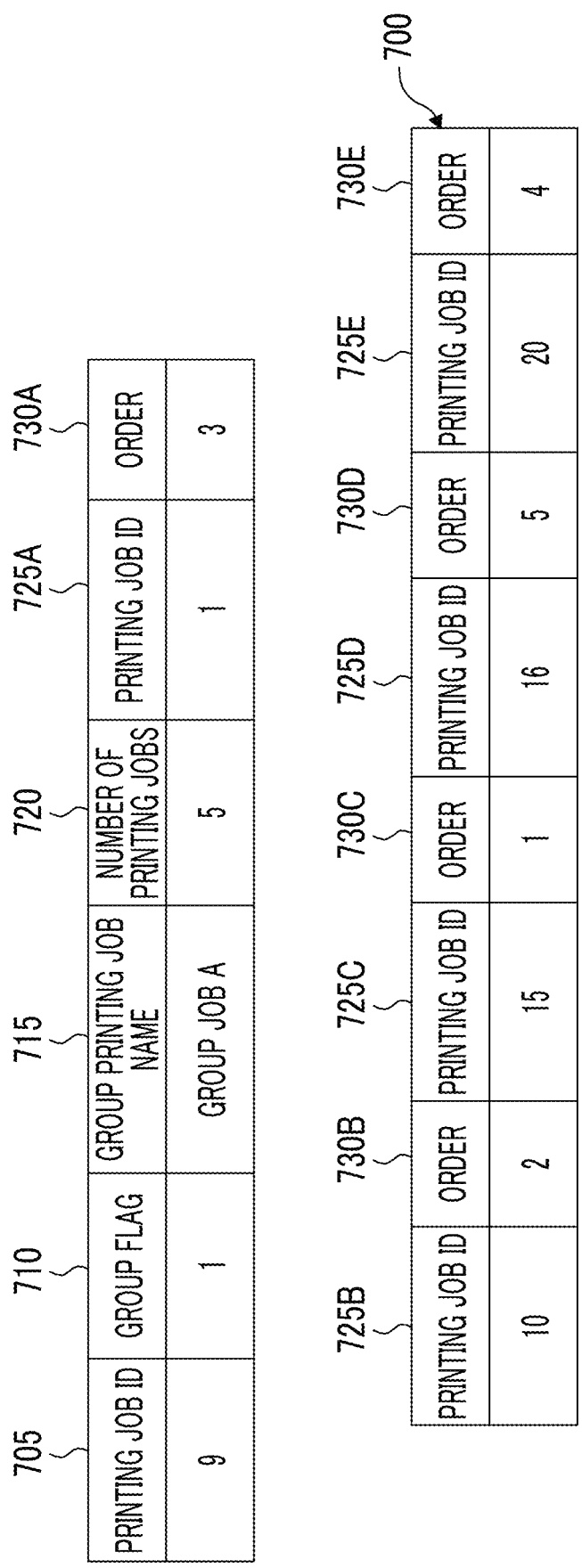
FIG. 7 is a diagram illustrating an example of a data structure of a group printing job table.

FIG. 7 is a diagram illustrating an example of a data structure of the group printing job table 700. In the group printing job table 700, the order of priority of each printing job is set. Specifically, the group printing job table 700 includes a printing job ID column 705, a group flag column 710, a group printing job name column 715, a number-of-printing jobs column 720, a printing job ID column 725A, an order column 730A, a printing job ID column 725B, an order column 730B, a printing job ID column 725C, an order column 730C, a printing job ID column 725D, an order column 730D, a printing job ID column 725E, and an order column 730E. The printing job ID column 705 stores a printing job ID. The group flag column 710 stores information (group flag) indicating whether being a group printing job. The group printing job name column 715 stores the name of the group printing job. The number-of-printing jobs column 720 stores the number of printing jobs included in the group printing job. The number-of-printing jobs column 720 is followed by the number of sets of the printing job ID column 725 and the order column 730 which correspond to the number in the number-of-printing jobs column 720. The printing job ID column 725 stores a printing job ID included in the group printing job. The order column 730 stores the order of priority (the order of printing) in the group printing job of the printing job having the printing job ID.

The process of step S504 is performed by checking the group flag column 710.

For example, FIG. 7 shows group flag: 1, group printing job name: group job A, and the number of printing jobs: 5 regarding printing job ID: 9, shows order: 3 regarding printing job ID: 1, shows order: 2 regarding printing job ID: 10, shows order: 1 regarding printing job ID: 15, shows order: 5 regarding printing job ID: 16, and shows order: 4 regarding printing job ID: 20.

An example of a data structure of a printing job constituting a single printing job or a group printing job is the printing job table 800.

FIG. 8 is a diagram illustrating an example of a data structure of the printing job table 800. The printing job table 800 includes a printing job ID column 805, a group flag column 810, a printing job name column 815, an owner column 820, a number-of-pages column 825, a number-of-copies column 830, a sheet size column 835, a sheet type column 840, a printing document column 845, a color/black-and-white column 850, a designated date and time column 855, and a post-processing column 860. The printing job ID column 805 stores a printing job ID. The group flag column 810 stores information (group flag) indicating whether being a group printing job. The printing job name column 815 stores a printing job name. The owner column 820 stores the owner (the owner of printed matter which is the final processing result, an end user) of the printing job. The number-of-pages column 825 stores the number of pages of a printing document in the printing job. The number-of-copies column 830 stores the number of copies of printing in the printing job. The sheet size column 835 stores the size of a sheet in the printing job. The sheet type column 840 stores the type of sheet. The printing document column 845 stores a printing document in the printing job. The printing document column may store the printing document itself, or may store a location where the printing document is stored (for example, a document ID, a document name, a Uniform Resource Locator (URL), or the like). The color/black-and-white column 850 may store information indicating whether the printing job is color printing or black-and-white printing. In the color/black-and-white column 850, not only color and black-and-white but also a special color (a gold color, a silver color, a fluorescent color, and the like) may be designated. The designated date and time column 855 stores the date and time of designation. The post-processing column 860 stores post-processing (for example, stapler processing, punching processing, binding processing, and the like) in the printing job.

The process of step S504 is performed by checking the group flag column 810.

Figure 9:
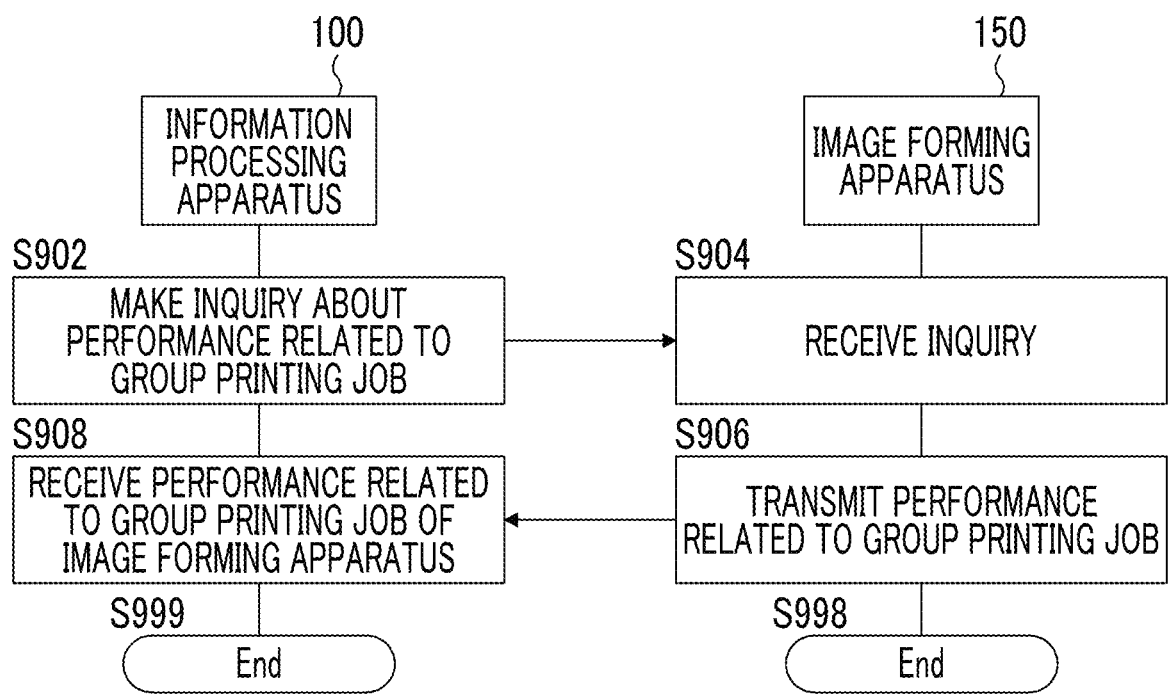
FIG. 9 is a flowchart illustrating a processing example according to this exemplary embodiment.

FIG. 9 is a flowchart illustrating a processing example according to this exemplary embodiment.

In step S902, the information processing apparatus 100 inquires the image forming apparatus 150 of performance related to a group printing job.

In step S904, the image forming apparatus 150 receives the inquiry from the information processing apparatus 100.

In step S906, the image forming apparatus 150 transmits the performance related to the group printing job to the information processing apparatus 100. For example, the printing apparatus table 1000 to be described later is transmitted.

In step S908, the information processing apparatus 100 receives the performance related to the group printing job of the image forming apparatus 150. For example, the printing apparatus table 1000 to be described later is received.

Meanwhile, in step S906, only the value in the group printing job performance column 1020 of the printing apparatus table 1000 may be transmitted, instead of transmitting the entire printing apparatus table 1000.

FIG. 10 is a diagram illustrating an example of a data structure of the printing apparatus table 1000. The printing apparatus table 1000 includes a printing apparatus ID column 1005, a printing apparatus name column 1010, a printing speed column 1015, a group printing job performance column 1020, a mountable toner type column 1025, a mountable sheet column 1030, a double-sided printing column 1035, a maximum sheet feed capacity column 1040, a number-of-discharging-destinations column 1045, a post-processing function column 1050, and a printing cost column 1055. The printing apparatus ID column 1005 stores information (printing apparatus ID) for uniquely identifying a printing apparatus in this exemplary embodiment. The printing apparatus name column 1010 stores the name of the printing apparatus. The printing speed column 1015 stores a printing speed of the printing apparatus. Meanwhile, in the printing speed column 1015, a printing speed may be provided for each type of sheet (A4 size, A3 size, and the like). The group printing job performance column 1020 stores supporting conditions for the group printing job included in the printing apparatus. For example, the group printing job performance column stores information (flag) indicating "it is possible to correspond to a job ticket supporting the group printing job", "it is possible to correspond to archives of printing jobs included in the group printing job", "it is possible to correspond to a job ticket into which a tag of "group printing job" is inserted", "it is not possible to correspond to the group printing job", and the like. Meanwhile, in a case where the group printing job performance column 1020 itself is not present, it may be determined that "it is not possible to correspond to the group printing job". The mountable toner type column 1025 stores the type of toner mountable in the printing apparatus. For example, the type of toner includes the type of color toner (a black toner, a cyan toner, a magenta toner, a yellow toner, a special color toner, and the like). The mountable sheet column 1030 stores a sheet mountable in the printing apparatus. The double-sided printing column 1035 stores information indicating whether or not the printing apparatus is capable of performing double-sided printing. The maximum sheet feed capacity column 1040 stores a maximum sheet feed capacity of the printing apparatus. The number-of-discharging-destinations column 1045 stores the number of discharging destinations included in the printing apparatus. Further, the number-of-discharging-destinations column may store a capacity (the number of discharged sheets capable of being received by the discharged sheet reception unit) in the discharging destination. The post-processing function column 1050 stores a post-processing function of the printing apparatus. The printing cost column 1055 stores printing costs in the printing apparatus.

Meanwhile, in a case where the number of printing apparatuses capable of printing a group printing job is two or more, a printing apparatus having a short printing time (a high printing speed) and low printing costs may be selected.

Figure 11:
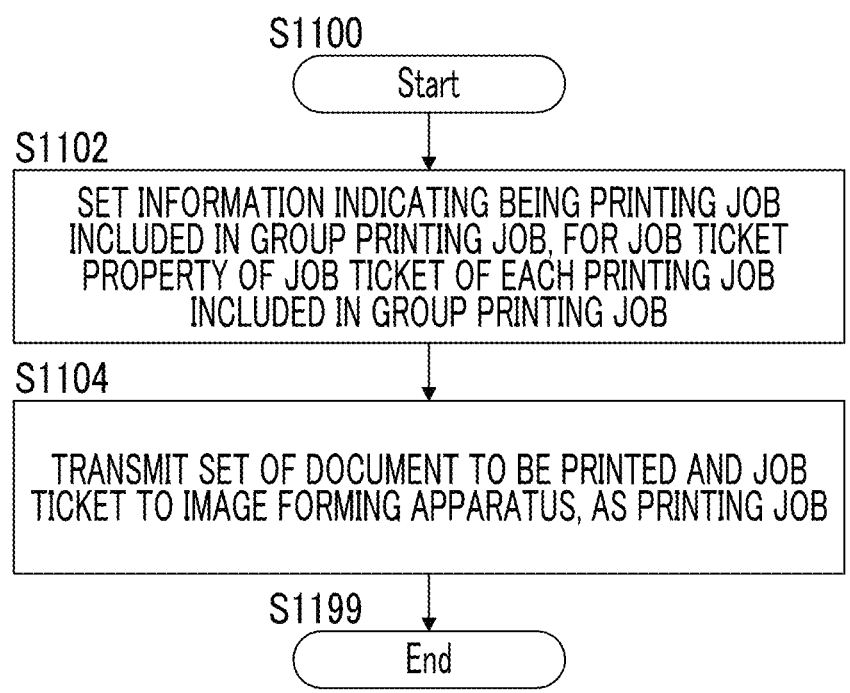
FIG. 11 is a flowchart illustrating a processing example according to this exemplary embodiment.

FIG. 11 is a flowchart illustrating a processing example (step S510) according to this exemplary embodiment.

In step S1102, information indicating being a printing job included in the group printing job is set for a job ticket property of a job ticket of each printing job included in the group printing job. Details will be described with reference to step S1208 illustrated in the example of FIG. 12 and the example of FIG. 13.

In step S1104, a set of a document to be printed and a job ticket is transmitted to the image forming apparatus 150 as a printing job.

Figure 12:
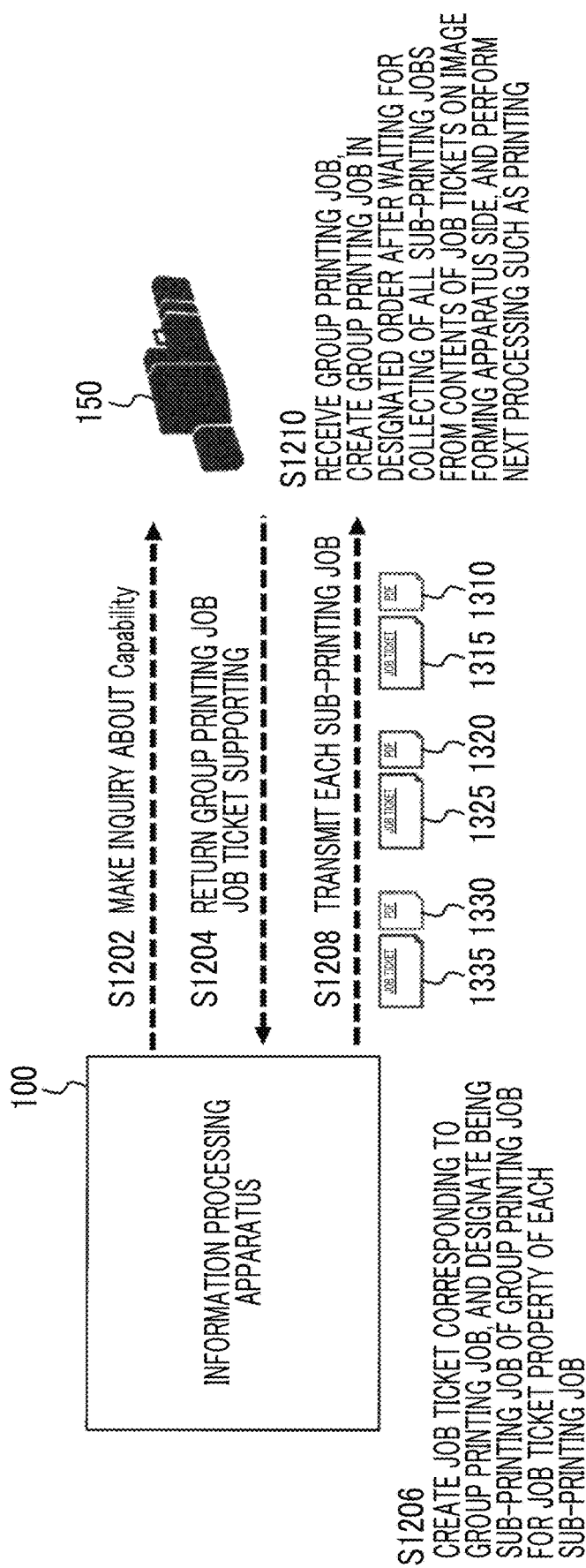
FIG. 12 is a diagram illustrating a processing example according to this exemplary embodiment.

FIG. 12 is a diagram illustrating a processing example according to this exemplary embodiment. The drawing illustrates an example of processing performed between the information processing apparatus 100 and the image forming apparatus 150. In particular, the drawing illustrates a processing example related to step S510. That is, the drawing illustrates an example in which the image forming apparatus 150 supports the designation of a group printing job by a job ticket. A job ticket for group printing job (for example, IPP, XPIF, and JDF) based on a supporting protocol is created and transmitted to the image forming apparatus 150.

In step S1202, the information processing apparatus 100 inquires the image forming apparatus 150 of Capability (performance related to the group printing job).

In step S1204, the image forming apparatus 150 returns group printing job job ticket supporting to the information processing apparatus 100.

For example, an inquiry of group-job-col-supported is made by Get-Printer-Attribute of an IPP protocol (step S1202) to obtain the following information from the image forming apparatus 150 (step S1204).
- group-job-col-supported:
- group-job-name
- group-job-id
- sub-job-id
- sub-job-total-number By this processing, it is possible to confirm specifications of the group printing job of the target image forming apparatus 150 without going through the user's operation.

In step S1206, the information processing apparatus 100 creates a job ticket corresponding to the group printing job, and designates being a sub-printing job of the group printing job for a job ticket property of each sub-printing job. Meanwhile, the sub-printing job refers to a printing job constituting the group printing job.

In step S1208, the information processing apparatus 100 transmits each sub-printing job to the image forming apparatus 150. For example, the information processing apparatus transmits a combination of a job ticket 1315 and a PDF 1310, a combination of a job ticket 1325 and a PDF 1320, a combination of a job ticket 1335 and a PDF 1330 which are illustrated in FIG. 13, and the like.

In step S1210, the image forming apparatus 150 receives the group printing job from the information processing apparatus 100, creates a group printing job in the designated order after waiting for the collecting of all of the sub-printing jobs from contents of the job tickets on the image forming apparatus 150 side, and performs the next processing such as printing.

Figure 13:
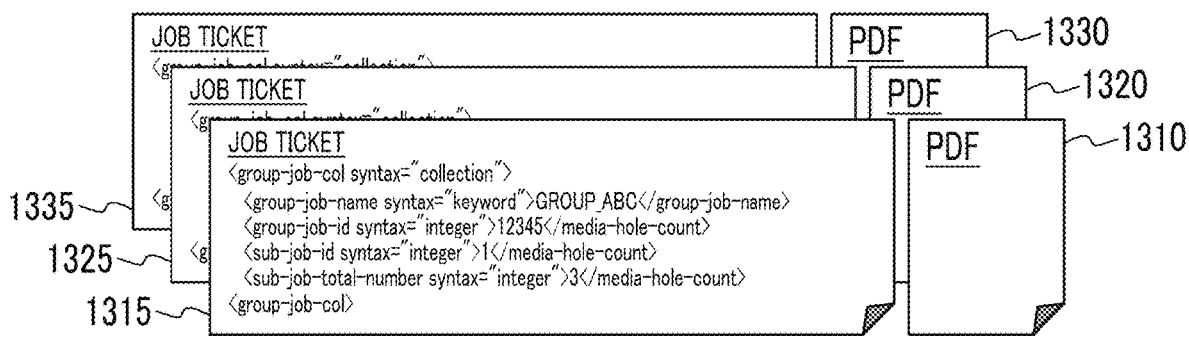
FIG. 13 is a diagram illustrating an example of a combination of a printing job ticket and a document to be printed.

FIG. 13 is a diagram illustrating an example of a combination of a printing job ticket (the job ticket 1315, the job ticket 1325, and the job ticket 1335) and a document to be printed (the PDF 1310, the PDF 1320, and the PDF 1330). The drawing illustrates an example of the combination transmitted in step S1208.

In the job ticket 1315, for example,

```
"<group-job-col syntax="collection">
    <group-job-name
syntax="keyword">GROUP_ABC</group-job-name>
    <group-job-id
syntax="integer">12345</media-hole-count>
        <sub-job-id syntax="integer">1</media-hole-count>
        <sub-job-total-number
syntax="integer">3</media-hole-count>
    </group-job-col>" is described.
```

The PDF 1310 is attached in association with the job ticket 1315. That is, the image forming apparatus 150 prints the PDF 1310 in accordance with the job ticket 1315.

Figure 14:
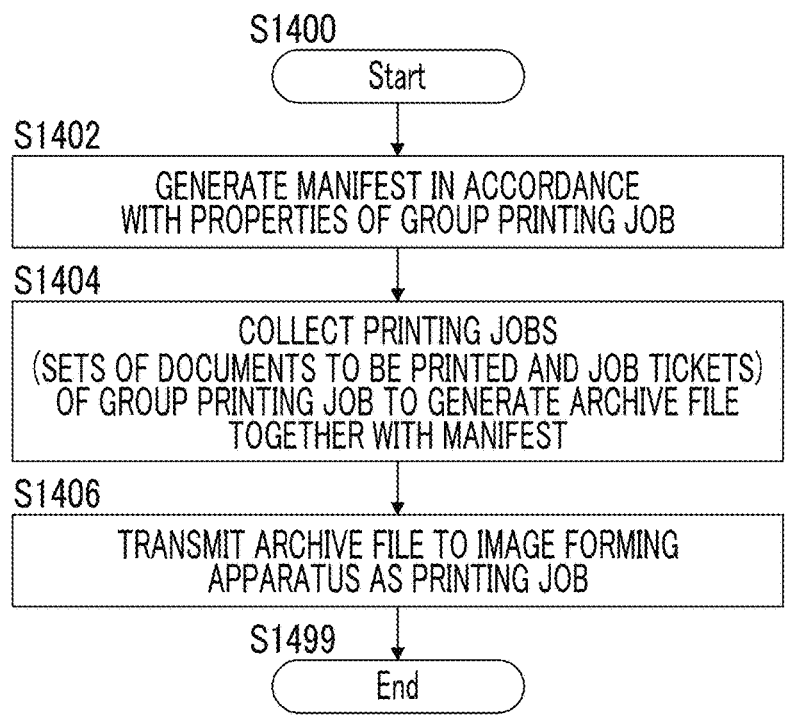
FIG. 14 is a flowchart illustrating a processing example according to this exemplary embodiment.

FIG. 14 is a flowchart illustrating a processing example (step S514) according to this exemplary embodiment.

In step S1402, a manifest 1610 is generated in accordance with properties of a group printing job.

In step S1404, printing jobs (sets of documents to be printed and job tickets) of the group printing job are collected to generate an archive file together with the manifest 1610. Details will be described later with reference to step S1506 illustrated in the example of FIG. 15 and the example of FIG. 16.

In step S1406, the archive file is transmitted to the image forming apparatus 150 as a printing job.

Figure 15:
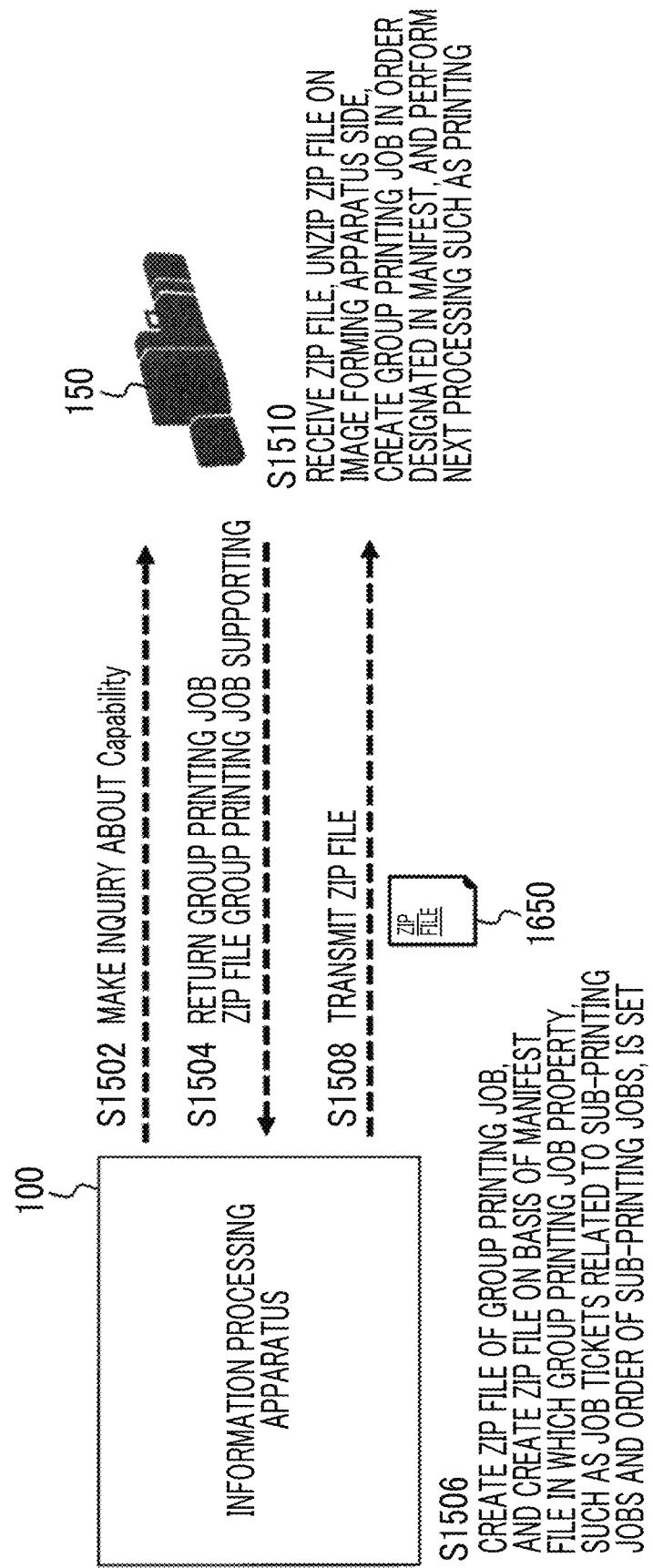
FIG. 15 is a diagram illustrating a processing example according to this exemplary embodiment.

FIG. 15 is a diagram illustrating a processing example according to this exemplary embodiment. The drawing illustrates an example of processing performed between the information processing apparatus 100 and the image forming apparatus 150. In particular, the drawing illustrates a processing example related to step S514. That is, the image forming apparatus 150 supports the reception of an archived group printing job.

The group printing job is archived as a ZIP file and is transmitted to a printer.

In step S1502, the information processing apparatus 100 inquires the image forming apparatus 150 of Capability (performance related to the group printing job).

In step S1504, the image forming apparatus 150 returns group printing job ZIP file group printing job supporting to the information processing apparatus 100.

In step S1506, the information processing apparatus 100 creates a ZIP file of the group printing job, and creates a ZIP file on the basis of a manifest file in which group printing job properties such as a job ticket related to the sub-printing jobs and the order of the sub-printing jobs are set.

In step S1508, the information processing apparatus 100 transmits the ZIP file to the image forming apparatus 150. For example, a ZIP file 1650 illustrated in FIG. 16 is transmitted.

In step S1510, the image forming apparatus 150 receives the ZIP file 1650 from the information processing apparatus 100, unzips the ZIP file 1650 on the image forming apparatus 150 side, creates a group printing job in the order designated in the manifest 1610, and performs the next processing such as printing.

Figure 16:
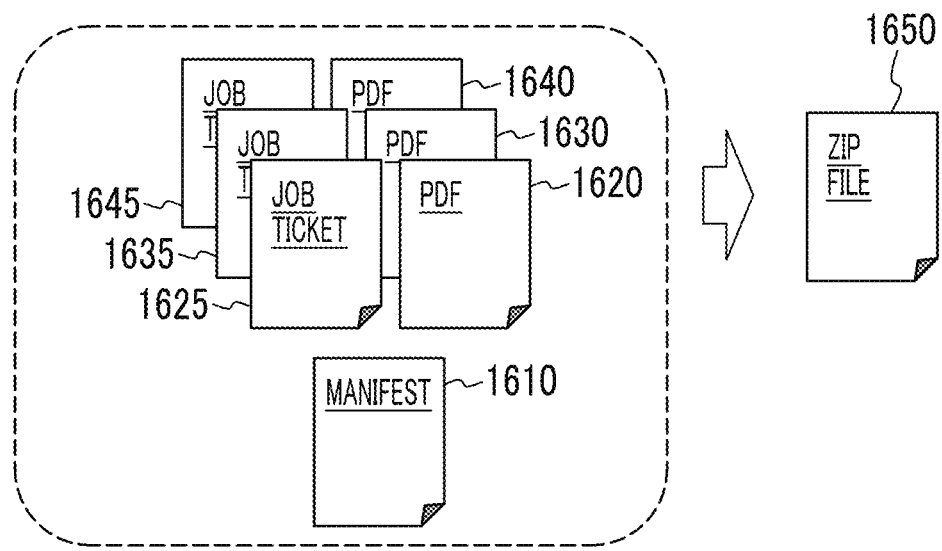
FIG. 16 is a diagram illustrating an example of contents of an archive file.

FIG. 16 is a diagram illustrating an example of contents of an archive file.

Archives (ZIP file 1650) for a combination of a PDF 1620 and a job ticket 1625, a combination of a PDF 1630 and a job ticket 1635, a combination of a PDF 1640 and a job ticket 1645, and the sets of the manifest 1610 are created. Meanwhile, ZIP is used as an example of the archives, but another format may be used as long as one or more files may be integrally handled. In the manifest 1610, group printing job properties, such as the order of sub-printing jobs, are set as described above, and information illustrated in, for example, the examples of the group printing job table 600 and the group printing job table 700, and the like are described. Naturally, the image forming apparatus 150 may analyze the manifest 1610, and performs printing processing in accordance with the information included in the manifest 1610.

Figure 17:
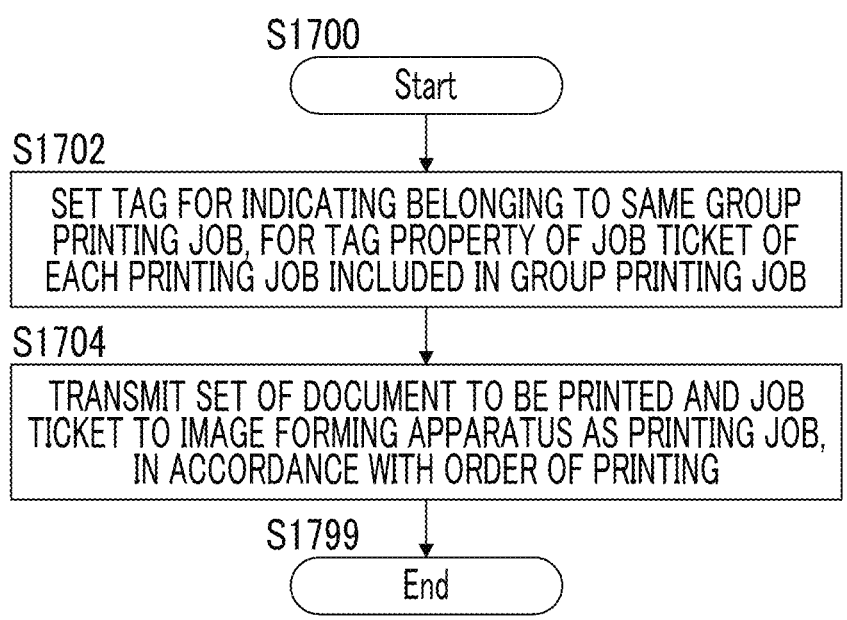
FIG. 17 is a flowchart illustrating a processing example according to this exemplary embodiment.

FIG. 17 is a flowchart illustrating a processing example (step S518) according to this exemplary embodiment.

In step S1702, a tag for indicating belonging to the same group printing job is set for a tag property of a job ticket of each printing job included in a group printing job. Details will be described later with reference to step S1806 illustrated in the example of FIG. 18 and the example of FIG. 19.

In step S1704, a set of a document to be printed and a job ticket is transmitted to the image forming apparatus 150 as a printing job, in accordance with the order of printing.

Figure 18:
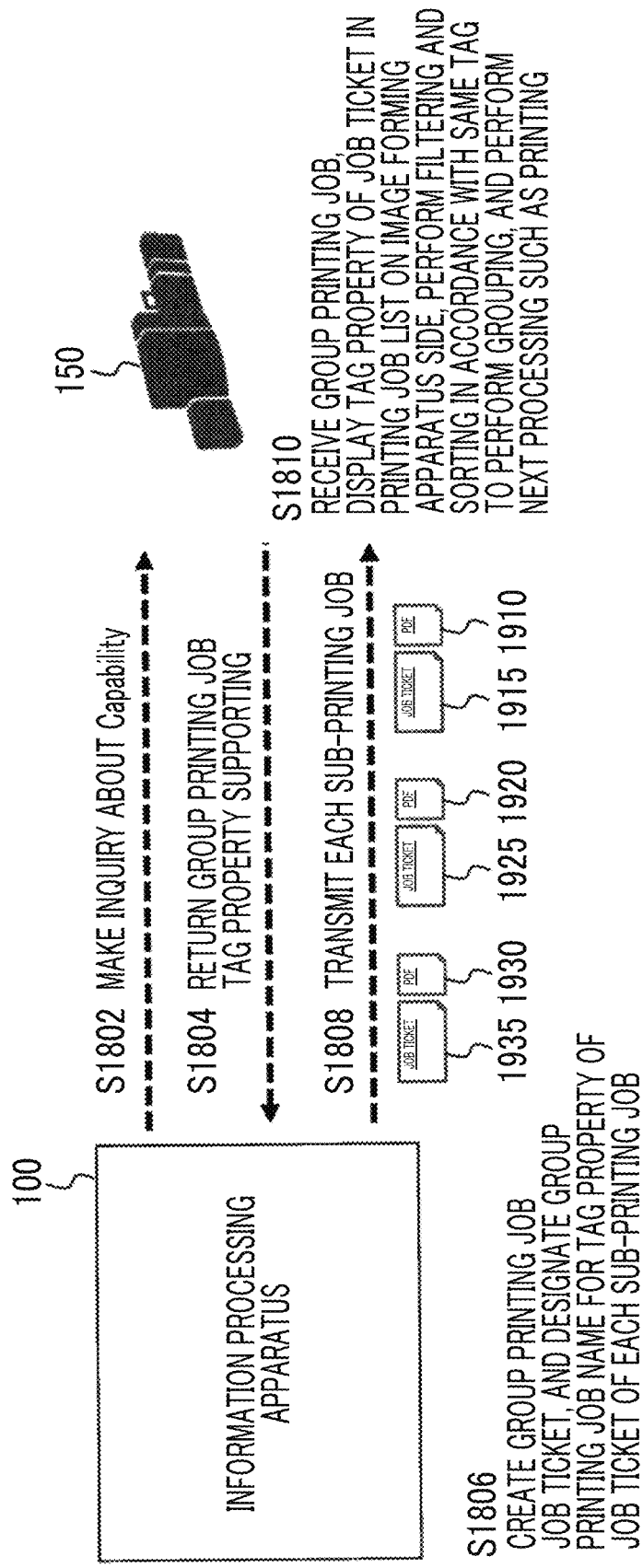
FIG. 18 is a diagram illustrating a processing example according to this exemplary embodiment.

FIG. 18 is a diagram illustrating a processing example according to this exemplary embodiment. The drawing illustrates an example of processing performed between the information processing apparatus 100 and the image forming apparatus 150. In particular, the drawing illustrates a processing example related to step S518. That is, the image forming apparatus 150 supports the designation of a group printing job as a printing job property. A group tag for indicating that plural printing jobs belong to the same group is designated for a printing job property supported by each image forming apparatus 150 to transmit a printing job.

In step S1802, the information processing apparatus 100 inquires the image forming apparatus 150 of Capability (performance related to the group printing job).

In step S1804, the image forming apparatus 150 returns group printing job tag property supporting to the information processing apparatus 100.

In step S1806, the information processing apparatus 100 creates a group printing job job ticket, and designates a group printing job name for a tag property of a job ticket of each sub-printing job.

In step S1808, the information processing apparatus 100 transmits each sub-printing job to the image forming apparatus 150. For example, the information processing apparatus transmits a combination of a job ticket 1915 and a PDF 1910, a combination of a job ticket 1925 and a PDF 1920, a combination of a job ticket 1935 and a PDF 1930 which are illustrated in FIG. 19, and the like.

In step S1810, the image forming apparatus 150 receives the group printing job from the information processing apparatus 100, displays a tag property of a job ticket in a printing job list on the image forming apparatus 150 side, performs filtering and sorting in accordance with the same tag to perform grouping, and performs the next processing such as printing.

Figure 19:
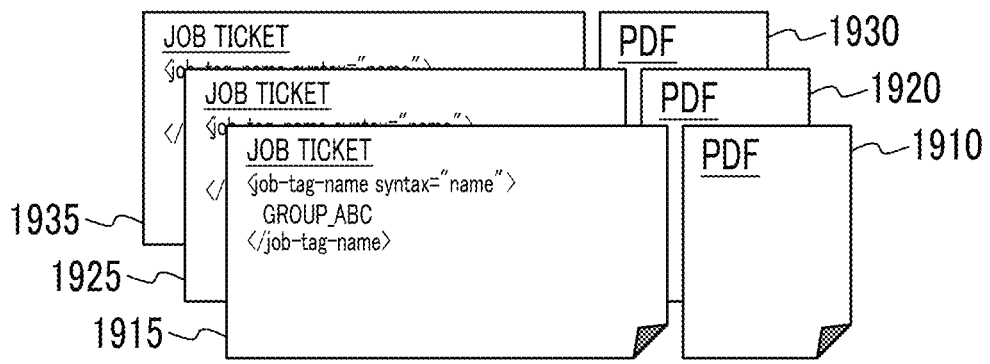
FIG. 19 is a diagram illustrating an example of a combination of a printing job ticket and a document to be printed.

FIG. 19 is a diagram illustrating an example of a combination of a printing job ticket and a document to be printed.

In the job ticket 1915, for example,

---
"<job-tag-name syntax="name">
GROUP_ABC
</job-tag-name>" is described.

---

The PDF 1910 is attached in association with the job ticket 1915. That is, the image forming apparatus 150 prints the PDF 1910 in accordance with the job ticket 1915. Here, the image forming apparatus 150 performs filtering (retrieval) or sorting (ascending order or descending order) in accordance with a tag ("job-tag-name" in the example of FIG. 19) to collectively perform printing processing on printing jobs included in the same group printing job. Meanwhile, tag names may be generated so that the order of printing is set to be ascending order or descending order.

Figure 20:
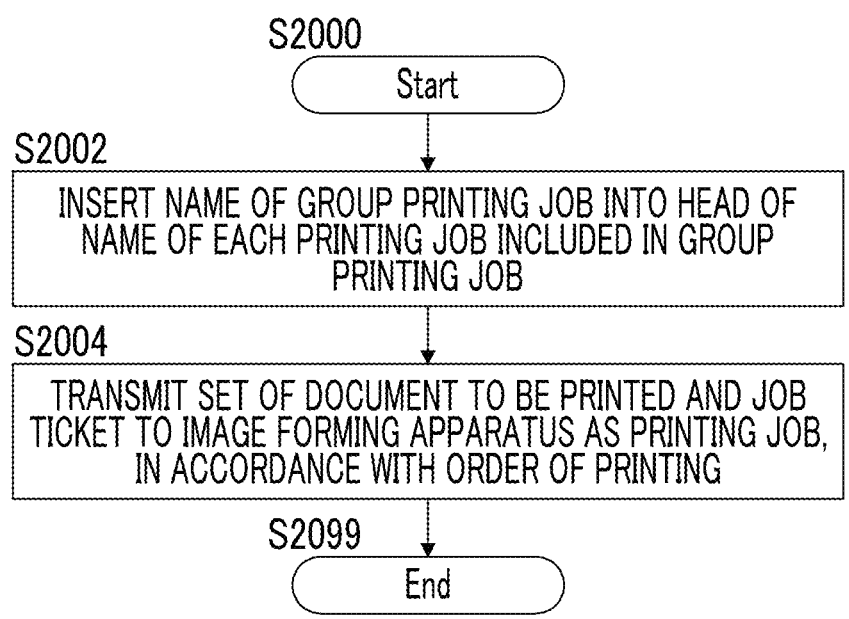
FIG. 20 is a flowchart illustrating a processing example according to this exemplary embodiment.

FIG. 20 is a flowchart illustrating a processing example (step S520) according to this exemplary embodiment. In FIG. 17, the processing example using the tag property of the job ticket has been described. However, the job ticket has at least a name column, and thus the name column may be used.

In step S2002, a name of a group printing job is inserted into the head of the name of each printing job included in the group printing job. Details will be described later with reference to step S2110 illustrated in the example of FIG. 21 and the example of FIG. 22.

In step S2004, a set of a document to be printed and a job ticket is transmitted to the image forming apparatus 150 as a printing job, in accordance with the order of printing.

Figure 21:
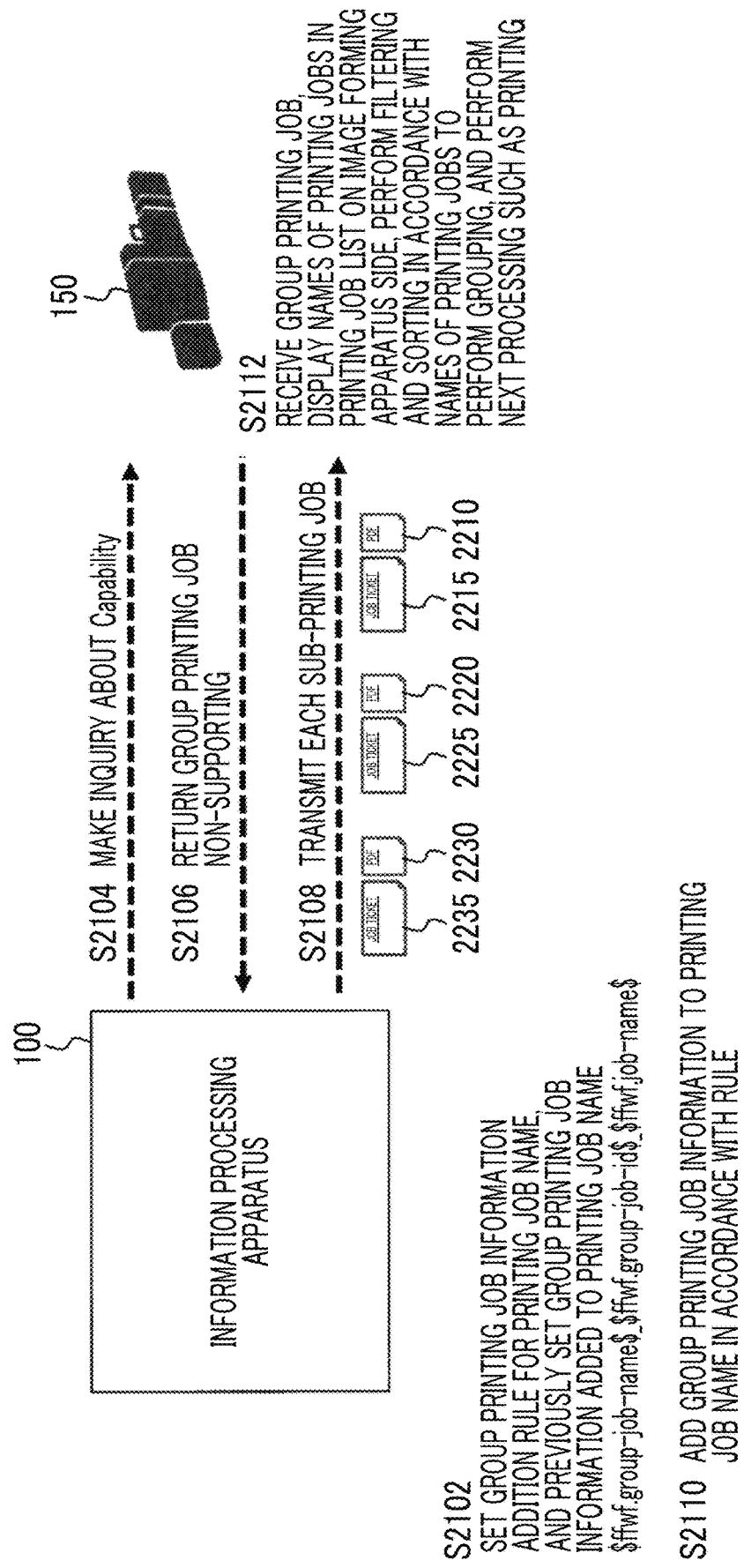
FIG. 21 is a diagram illustrating a processing example according to this exemplary embodiment.

FIG. 21 is a diagram illustrating a processing example according to this exemplary embodiment. The drawing illustrates an example of processing performed between the information processing apparatus 100 and the image forming apparatus 150. In particular, the drawing illustrates a processing example related to step S520. That is, the image forming apparatus 150 does not support a group printing job function. The printing job is transmitted by adding group information to a printing job name.

In step S2102, in the information processing apparatus 100, a group printing job information addition rule for the printing job name is set, and group printing job information to be added to the printing job name is set in advance.

For example, the following rule may be set.
$ffwf.group-job-name$_$ffwf.group-job-id$_$ffwf.job-name$ Specifically, a rule such as the addition of "<group printing job name><sub-printing job order number>" to the head of the printing job name is used.

In step S2104, the information processing apparatus 100 inquires the image forming apparatus 150 of Capability (performance related to the group printing job).

In step S2106, the image forming apparatus 150 returns group printing job non-supporting to the information processing apparatus 100.

In step S2108, the information processing apparatus 100 transmits each sub-printing job to the image forming apparatus 150. For example, the information processing apparatus transmits a combination of a job ticket 2215 and a PDF 2210, a combination of a job ticket 2225 and a PDF 2220, and a combination of a job ticket 2235 and a PDF 2230 which are illustrated in FIG. 22, and the like.

In step S2110, the information processing apparatus 100 adds group printing job information to the printing job name in accordance with the rule.

In step S2112, the image forming apparatus 150 receives the group printing job, displays names of printing jobs in a printing job list on the image forming apparatus 150 side, performs filtering and sorting in accordance with the names of the printing jobs to perform grouping, and performs the next processing such as printing.

Figure 22:
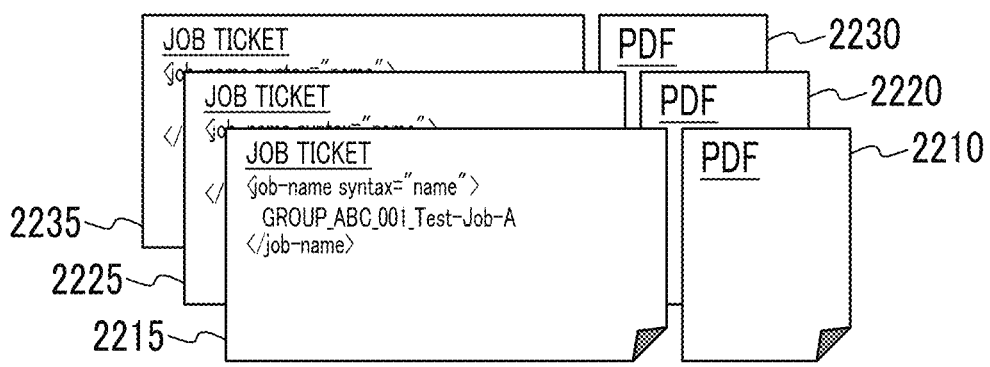
FIG. 22 is a diagram illustrating an example of a combination of a printing job ticket and a document to be printed.

FIG. 22 is a diagram illustrating an example of a combination of a printing job ticket and a document to be printed.

In the job ticket 2215, for example,

---
"<job-name syntax="name">
GROUP-ABC_001_Test-Job-A
</job-name>" is described.

---

The PDF 2210 is attached in association with the job ticket 2215. That is, the image forming apparatus 150 prints the PDF 2210 in accordance with the job ticket 2215. Meanwhile, here, the image forming apparatus 150 may not analyze the group printing job itself, and thus the image forming apparatus performs filtering (retrieval) or sorting (ascending order or descending order) in accordance with the names ("job-name" in the example of FIG. 22) of the printing jobs to collectively perform printing processing on the printing jobs included in the same group printing job. Meanwhile, tag names may be generated so that the order of printing is set to be ascending order or descending order.

Figure 23:
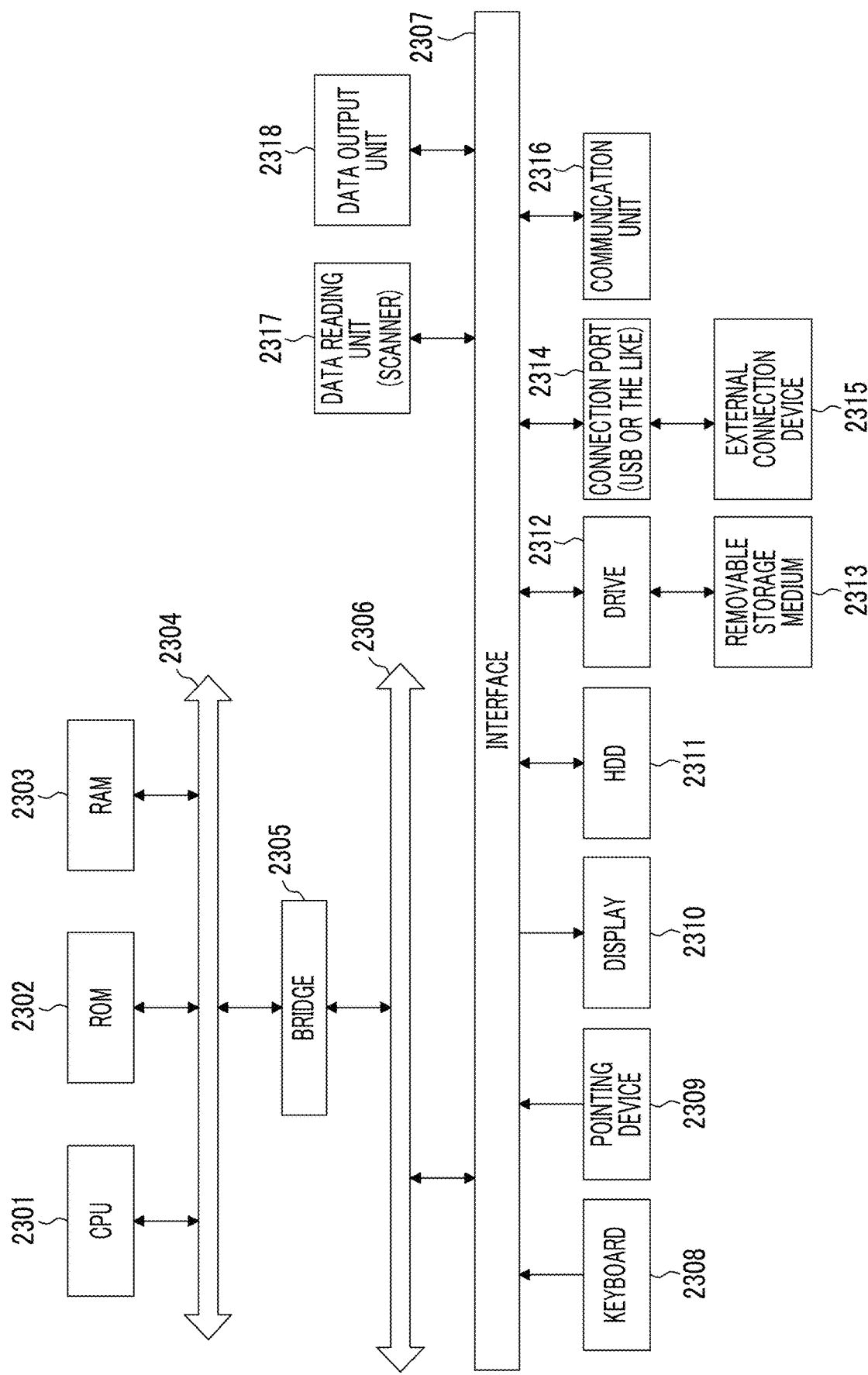
FIG. 23 is a block diagram illustrating a hardware configuration example of a computer for realizing this exemplary embodiment.

A hardware configuration example of the information processing apparatus 100 according to this exemplary embodiment will be described with reference to FIG. 23. A configuration illustrated in FIG. 23 is configured by, for example, a personal computer (PC) or the like, and the hardware configuration example including a data reading unit 2317 such as a scanner and a data output unit 2318 such as a printer is illustrated.

A Central Processing Unit (CPU) 2301 is a control unit that executes processing based on a computer program in which the execution sequence of various modules described in the above-described exemplary embodiment, that is, the reception module 105, the printing job distribution module 110, the single printing job transmission module 115, the image forming apparatus performance detection module 120, the inquiry module 122, the performance reception module 124, the group printing job transmission module 130, the transmission method determination module 132, the transmission module 134, and the image forming apparatus communication module 140 is described.

A Read Only Memory (ROM) 2302 stores programs, computational parameters, and the like which are used by the CPU 2301. A Random Access Memory (RAM) 2303 stores programs used in the execution of the CPU 2301, parameters that appropriately change in the execution, and the like. The Rom and the RAM are connected to each other by a host bus 2304 constituted by a CPU bus or the like.

The host bus 2304 is connected to an external bus 2306 such as a Peripheral Component Interconnect/Interface (PCI) bus through a bridge 2305.

A keyboard 2308 and a pointing device 2309 such as a mouse are devices operated by an operator. A display 2310 is a liquid crystal device, a Cathode Ray Tube (CRT), or the like, and displays various pieces of information as texts or image information. In addition, a touch screen or the like which has both functions as the pointing device 2309 and the display 2310 may be used. In this case, regarding the realization of the function of the keyboard, the function of the keyboard may be realized by drawing a keyboard (also referred to as a so-called software keyboard, a screen keyboard, or the like) on a screen (touch screen) using software without physical connection like the keyboard 2308.

A Hard Disk Drive (HDD) 2311 has a hard disk (may be a flash memory or the like) embedded therein, drives the hard disk, and records or reproduces programs executed by the CPU 2301 and information. The hard disk stores the group printing job table 600, the group printing job table 700, the printing job table 800, the printing apparatus table 1000, job tickets, documents for printing, and the like. Further, the hard disk stores various other data, various computer programs, and the like.

The drive 2312 reads out data or programs recorded in a removable storage medium 2313, such as a magnetic disk, an optical disk, a magneto-optical disk, or a semiconductor memory, which is mounted therein, and supplies the data or the programs to the RAM 2303 connected thereto through an interface 2307, the external bus 2306, the bridge 2305, and the host bus 2304. Meanwhile, the removable storage medium 2313 may also be used as data storage region.

The connection port 2314 is a port for connection to an external connection device 2315, and includes a connection unit such as a USB or IEEE1394. The connection port 2314 is connected to the CPU 2301 and the like through the interface 2307, the external bus 2306, the bridge 2305, the host bus 2304, and the like. A communication unit 2316 is connected to a communication line, and executes data communication processing with the outside. The data reading unit 2317 is, for example, a scanner, and executes a process of reading a document. A data output unit 2318 is, for example, a printer, and executes a process of outputting document data.

Meanwhile, a hardware configuration of the information processing apparatus 100 illustrated in FIG. 23 shows one configuration example. This exemplary embodiment is not limited to the configuration illustrated in FIG. 23, and the information processing apparatus may be configured such that the modules described in this exemplary embodiment are capable of being executed. For example, some modules may be constituted by dedicated hardware (for example, an Application Specific Integrated Circuit (ASIC) or the like), some modules may be configured to be provided in an external system and connected to each other through a communication line, or plural systems each of which is illustrated in FIG. 23 may be connected to each other through a communication line and operated in cooperation with each other. In addition, the information processing apparatus may be particularly incorporated into portable information communication equipment (including a mobile phone, a smart phone, a mobile equipment, a wearable computer, and the like), an information appliance, a robot, a copying machine, a facsimile, a scanner, a printer, a multi-function machine (an image processing apparatus including any two or more of a scanner, a printer, a copying machine, and a facsimile), and the like, in addition to a personal computer.

Meanwhile, the programs described above may be provided through a recording medium which stores the programs, or may be provided through a communication unit. In these cases, for example, the programs described above may be interpreted as an invention of "a computer-readable recording medium that stores programs".

The "computer-readable recording medium that stores programs" refers to a computer-readable recording medium that stores programs and is used for the installation and execution of the programs and the distribution of the programs.

Meanwhile, examples of the recording medium include a digital versatile disk (DVD) having a format of "DVD-R, DVD-RW, DVD-RAM, or the like" which is a standard developed by the DVD forum or having a format of "DVD+R, DVD+RW, or the like" which is a standard developed by the DVD+RW alliance, a compact disk (CD) having a format of CD read only memory (CD-ROM), CD recordable (CD-R), CD rewritable (CD-RW), or the like, a Blu-ray Disc (registered trademark), a magneto-optical disk (MO), a flexible disk (FD), a magnetic tape, a hard disk, a read only memory (ROM), an electrically erasable programmable ROM (EEPROM (registered trademark)), a flash memory, a random access memory (RAM), a secure digital (SD) memory card, and the like.

The above-described programs or some of them may be stored and distributed by recording on the recording medium. In addition, the programs may be transmitted through communication, for example, by using a transmission media of, for example, a wired network which is used for a local area network (LAN), a metropolitan area network (MAN), a wide area network (WAN), the Internet, an intranet, an extranet, and the like, a wireless communication network, or a combination of these. The programs may be carried on carrier waves.

Further, the above-described programs may be a portion or all of other programs, or may be recorded on a recording medium along with other programs. The programs may be recorded on plural recording media by dividing the programs. The programs may be recorded in any format, such as compression or encryption, as long as it is possible to restore the programs.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
receive a group printing job constituted by a plurality of printing jobs; and
transmit the group printing job to an image forming apparatus, in accordance with performance related to the group printing job of the image forming apparatus, wherein
in a case where the image forming apparatus is capable of receiving a job ticket in which a description related to the group printing job is made, the processor transmits the printing jobs included in the group printing job to the image forming apparatus while attaching the job ticket,
at least information indicating an order of priority of each printing in the group printing job is described in the job ticket.

2. The information processing apparatus according to claim 1,
wherein in a case where the image forming apparatus is capable of receiving an archive of a printing job group constituting the group printing job, the processor transmits the archive of the printing job group constituting the group printing job to the image forming apparatus.

3. The information processing apparatus according to claim 2,
wherein the processor adds a file in which information on the group printing job is described, to the archive.

4. The information processing apparatus according to claim 1,
wherein in a case where the image forming apparatus is capable of receiving a job ticket in which information indicating being the group printing job is describable, the processor transmits the printing jobs included in the group printing job to the image forming apparatus while attaching the job ticket.

5. The information processing apparatus according to claim 4,
wherein the processor transmits the printing jobs to the image forming apparatus in accordance with an order of printing in the group printing job.

6. The information processing apparatus according to claim 1,
wherein in a case where the image forming apparatus does not correspond to the group printing job, the processor transmits the printing jobs to the image forming apparatus while including information on the group printing job in names of the printing jobs included in the group printing job.

7. The information processing apparatus according to claim 6,
wherein the processor transmits the printing jobs to the image forming apparatus in accordance with an order of printing in the group printing job.

8. The information processing apparatus according to claim 1,
wherein the processor is configured to:
make an inquiry about the performance related to the group printing job of the image forming apparatus;
receive the performance of the image forming apparatus from the image forming apparatus; and
determine a transmission method in accordance with the performance,
wherein the processor transmits the group printing job to the image forming apparatus by using the transmission method.

9. The information processing apparatus according to claim 8,
wherein the processor generates data of the group printing job, in accordance with the transmission method,
wherein the processor transmits the data of the group printing job to the image forming apparatus.

10. A non-transitory computer readable medium storing an information processing program causing a computer to:
receive a group printing job constituted by a plurality of printing jobs; and
transmit the group printing job to an image forming apparatus, in accordance with performance related to the group printing job of the image forming apparatus, wherein
in a case where the image forming apparatus is capable of receiving a job ticket in which a description related to the group printing job is made, the computer transmits the printing jobs included in the group printing job to the image forming apparatus while attaching the job ticket,
at least information indicating an order of priority of each printing in the group printing job is described in the job ticket.

11. An information processing method comprising:
receiving a group printing job constituted by a plurality of printing jobs; and
transmitting the group printing job to an image forming apparatus, in accordance with performance related to the group printing job of the image forming apparatus, wherein
in a case where the image forming apparatus is capable of receiving a job ticket in which a description related to the group printing job is made, transmitting the printing jobs included in the group printing job to the image forming apparatus while attaching the job ticket,
at least information indicating an order of priority of each printing in the group printing job is described in the job ticket.

* * * * *